(12) United States Patent
Maruta et al.

(10) Patent No.: US 7,512,604 B2
(45) Date of Patent: Mar. 31, 2009

(54) IMAGE PROCESSING APPARATUS FACILITATING INFORMATION MANAGEMENT

(75) Inventors: Syuji Maruta, Toyokawa (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 657 days.

(21) Appl. No.: 10/763,281

(22) Filed: Jan. 26, 2004

(65) Prior Publication Data

US 2004/0162854 A1    Aug. 19, 2004

(30) Foreign Application Priority Data

Jan. 29, 2003  (JP)  ............................. 2003-019928

(51) Int. Cl.
*G06F 17/30* (2006.01)
(52) U.S. Cl. .................. 707/7; 707/100; 707/104.1; 707/200
(58) Field of Classification Search ............. 707/7, 707/100, 104.1, 200
See application file for complete search history.

(56) References Cited

U.S. PATENT DOCUMENTS

2001/0032151 A1*  10/2001  Paul et al. .................. 705/26
2003/0184793 A1*  10/2003  Pineau ....................... 358/1.15
2004/0250203 A1*  12/2004  Yamada ...................... 715/517

FOREIGN PATENT DOCUMENTS

| JP | 10-271311 | 10/1998 |
| JP | 11-196206 | 7/1999 |
| JP | 2002-354164 | 12/2002 |

OTHER PUBLICATIONS

Japanese Office Action, with English-language Translation, dated Nov. 7, 2006.

* cited by examiner

*Primary Examiner*—Cheryl Lewis
(74) *Attorney, Agent, or Firm*—Buchanan Ingersoll & Rooney PC

(57) ABSTRACT

A new box storing information sorted for each individual or each prescribed department is to be registered with a first image processing apparatus, notification of a request to return a box name is transmitted to obtain additional information including a name(s) of a box(es) possessed by a second image processing apparatus. The second image processing apparatus responds to the notification by returning to the first image processing apparatus additional information including the name(s) of the box(es) that the second image processing apparatus possesses. The first image processing apparatus refers to the additional information obtained from the second image processing apparatus including the box name(s) to add to the new box the additional information including a box name and register the same.

23 Claims, 18 Drawing Sheets

| BOX CODE | NAME | STORED INFORMATION | BOX REGISTRATION DATE & TIME |
|---|---|---|---|
| 1 | SUZUKI | GAME RESULT.TXT | 2000.01.11 |
| 2 | INOUE | | 2000.02.03 |
| 3 | SAKURAI | FILE 1<br>FILE 2<br>INFORMATION OF LINK TO FILE 3 | 2000.05.07 |
| 4 | YAMAGUCHI | | 2000.05.09 |
| 5 | MORI | | 2000.05.12 |
| 6 | NAMINO | | 2000.08.22 |
| 7 | NOGUCHI | | 2000.08.26 |
| 8 | SAIJO | | 2000.10.04 |
| 9 | ASAKA | | 2000.11.18 |
| 10 | MORIMOTO | | 2000.12.20 |

FIG.11

| BOX CODE | NAME | STORED INFORMATION | BOX REGISTRATION DATE & TIME |
|---|---|---|---|
| 11 | BABA | | 2000.03.19 |
| 12 | SAKAGUCHI | | 2000.03.21 |
| 3 | SAKURAI | INFORMATION OF LINK TO FILE 1<br>INFORMATION OF LINK TO FILE 2<br>FILE 3 | 2000.06.15 |
| 4 | YAMAGUCHI | | 2000.06.09 |
| 5 | MORI | | 2000.08.12 |

FIG.12

| BOX CODE | NAME | STORED INFORMATION | BOX REGISTRATION DATE & TIME |
|---|---|---|---|
| 20 | MATSUDA | | 2001.01.19 |
| 21 | KAGA | | 2001.01.21 |
| 22 | ESUMI | | 2001.02.15 |
| 3 | SAKURAI | INFORMATION OF LINK TO FILE 1<br>INFORMATION OF LINK TO FILE 2<br>INFORMATION OF LINK TO FILE 3 | 2001.02.25 |

FIG.13

| BOX CODE | NAME | STORED INFORMATION | BOX REGISTRATION DATE & TIME |
|---|---|---|---|
| 3 | SAKURAI | INFORMATION OF LINK TO FILE 1<br>INFORMATION OF LINK TO FILE 2<br>INFORMATION OF LINK TO FILE 3 | 2001.01.27 |
| 22 | ESUMI | | 2001.03.03 |

FIG.16

INPUT BOX NAME a b ......................... z
@ . 0 1 ............ 9 - _

NAME REGISTRATION

BOX NAME DISPLAY PORTION

SELECT FROM CANDIDATE(S) BELOW BY NUMBER
1: PRODUCTION DEPARTMENT 1    2001.04.02
2: PRODUCTION                 2001.04.03
3: PRODUCTION 1               2001.04.05
4: PRODUCT DEPARTMENT 1       2001.04.07
5: PRODUCTION DEPARTMENT 2    2001.04.08

FIG.17

SELECT BOX NAME TO BE ERASED BY NUMBER

1: BOX 1         10: BOX 10
2: BOX 2
3: BOX 3
4: BOX 4
5: BOX 5
6: BOX 6
7: BOX 7
8: BOX 8
9: BOX 9

ERASURE DECISION

IMAGE PROCESSING APPARATUS FACILITATING INFORMATION MANAGEMENT

This application is based on Japanese Patent Application No. 2003-19928 filed with Japan Patent Office on Jan. 29, 2003, the entire content of which is hereby incorporated by reference.

BACKGROUND OF THE INVENTION

1. Field of the Invention

The present invention relates generally to image processing apparatuses, additional-information notification systems, image information communication systems and image processing methods, and particularly to image processing apparatuses, additional-information notification systems, image information communication systems and image processing methods that facilitate information management.

2. Description of the Related Art

In an image processing apparatus a storage device such as a hard disk is employed to store read image information or image information received through a communication function.

Furthermore, a technique used to sort received information for each destination is disclosed in Japanese Laid-Open Patent Publication No. 11-196206. More specifically, the document discloses a facsimile device including the step of sorting received, faxed information, and having a technique to sort received information into divided, address-only boxes for each address recognized from the received information.

Furthermore, in recent years, a printing device, a scanner device and a facsimile device that are combined together, or a so-called multi-function peripheral MFP) or other similar image processing apparatus is used for example to store data read via the scanner device and transmit such data to another image processing apparatus.

In such a conventional image processing apparatus, received data to be printed, faxed data or the like may not be printed out and instead be stored as electronic data. In such a case, the electronic data is stored to a sortation storage that stores information sorted for each individual or each prescribed department.

Normally, such a sortation storage is referred to for example as a box, and this box has added thereto a box name or the like corresponding to additional information. A box with such a box name is stored to an image processing apparatus by performing a prescribed registration operation in the apparatus.

If an image processing apparatus has a scanner function an image read via the scanner function can be sorted into the aforementioned box and stored as electronic data. Furthermore, received faxed data is sorted and stored as electronic data. After an appropriate period of time has elapsed, the stored electronic data is printed out by the apparatus.

However, when such a conventional processing apparatus is operated to create the aforementioned box it cannot reference boxes of other networked image processing apparatuses to create a box having a new box name. This can result in the apparatus erroneously registering a box having added thereto a box name identical or similar to a box that another apparatus has.

Furthermore, an image processing apparatus of interest can disadvantageously be prevented from registering therewith a box having a box name similar to a box that another image processing apparatus has. Thus the user cannot register a box name as intended.

Furthermore, the conventional image processing apparatus cannot print out directly on a sheet the electronic data stored in a box of a remote image processing apparatus. To allow the apparatus of interest to print such data it is necessary to once obtain the data for the apparatus. This involves a waiting time corresponding to an amount of electronic data before the data is obtained from the remote location and the user must wait in front of the image processing apparatus.

SUMMARY OF THE INVENTION

One object of the present invention is to provide an image processing apparatus, additional-information notification system, image information communication system and image processing method that can help a user to control image information or other similar information.

The above object of the present invention can be achieved by an image processing apparatus including: a sortation memory portion provided in a form of a virtually sorted, prescribed memory area to store information sorted by each prescribed condition for the prescribed condition; an information adding portion adding additional information to the sortation memory portion; an acquisition portion acquiring from a different image processing apparatus information including additional information; a comparison and display portion comparing the additional information acquired by the acquisition portion from the different image processing apparatus with the additional information added by the information adding portion to the sortation memory portion, and displaying similar additional information; and a registration portion selectively registering one of the additional information displayed by the comparison and display portion and the additional information added by the information adding portion to the sortation memory portion.

Thus boxes corresponding to sortation memory portions of the same name produced in networked image processing apparatuses, respectively, can be shared as if they were a single box. Furthermore, in effect, single information of an original can be held on the network, and unnecessary consumption of storage capacity can be avoided.

The present invention in another aspect provides the image processing apparatus including: a sortation memory portion provided in a form of a virtually sorted, prescribed memory area to store sorted information; an information adding portion adding additional information to the sortation memory portion; an acquisition portion acquiring from a different image processing apparatus information including additional information; a comparison portion comparing the additional information acquired by the acquisition portion from the different image processing apparatus with the additional information added by the information adding portion to the sortation memory portion to output a result of the comparing; and a registration portion driven by the result to register the additional information added by the information adding portion to the sortation memory portion.

Thus boxes corresponding to sortation memory portions of the same name produced in networked image processing apparatuses, respectively, can be shared as if they were a single box.

The present invention in still another aspect provides the image processing apparatus including: a sortation memory portion provided in a form of virtually sorted, prescribed memory area to store information of an original sorted by identification information; a registration portion registering information with the sortation memory portion; a notification portion notifying a different image processing apparatus of information registered by the registration portion; an acquisition portion acquiring from the different image processing apparatus information of an original sorted stored in the different image processing apparatus at a sortation memory portion having registered therewith information identical to information imparted by the notification portion; and a storage portion storing to the sortation memory portion information of an original acquired by the acquisition portion from the different image processing portion.

Thus boxes corresponding to sortation memory portions of the same name produced in networked image processing apparatuses, respectively, can be shared as if they were a single box. Furthermore, information present in a box within a different, remote image processing apparatus can be readily obtained.

The present invention in still another aspect provides the image processing apparatus including: a sortation memory portion provided in a form of a virtually sorted, prescribed memory area to store sorted information; an information adding portion adding additional information to the sortation memory portion; an acquisition portion acquiring from a different image processing apparatus information including additional information; a decision portion deciding whether there exists in the image processing apparatus additional information added by the information adding portion to the sortation memory portion that is identical to additional information acquired by the acquisition portion from the different image processing apparatus; and an erasure portion driven by a result of a decision made by the decision portion and the additional information acquired by the acquisition portion from the different image processing apparatus to erase the information stored in the sortation memory portion that is associated with the additional information acquired by the acquisition portion from the different image processing apparatus.

Thus boxes corresponding to sortation memory portions of the same name produced in networked image processing apparatuses, respectively, can be shared as if they were a single box. Furthermore, in effect, single information of an original can be held on the network, and unnecessary consumption of storage capacity can be avoided.

The present invention in still another aspect provides the image processing apparatus including: a sortation memory portion provided in a form of a virtually sorted, prescribed memory area to store information of an original sorted by additional information added to an image of the original; a detection portion detecting that the additional information has at least a portion designated; an erasure portion erasing from the sortation memory portion additional information detected by the detection portion as having been designated and the information of the original with the additional information added thereto; and a notification portion notifying a different image processing apparatus of the additional information erased by the erasure portion.

Thus boxes corresponding to sortation memory portions of the same name produced in networked image processing apparatuses, respectively, can be shared as if they were a single box. Furthermore, a different image processing apparatus can also have appropriate additional information erased therefrom.

The present invention in still another aspect provides an additional-information notification system including a plurality of image processing apparatuses each including: a sortation memory portion provided in a form of a virtually sorted, prescribed memory area to store sorted information; an information adding portion adding additional information to the sortation memory portion; a first notification portion notifying a different image processing apparatus of the additional information added by the information adding portion to the sortation memory portion; a decision portion deciding whether there exists in the image processing apparatus additional information identical or similar to additional information imparted by the first notification portion from a different image processing apparatus; a second notification portion notifying of a result of a decision made by the decision portion the different image processing apparatus notified by the first notification portion of the additional information; and a registration portion driven by the result informed by the second notification portion from a different image processing apparatus to register with the image processing apparatus of interest the additional information added by the information adding portion to the sortation memory portion.

Thus boxes corresponding to sortation memory portions of the same name produced in networked image processing apparatuses, respectively, can be shared as if they were a single box. Furthermore, each box's information can be shared in real time.

The present invention in still another aspect provides the additional-information notification system including a plurality of information processing apparatuses including first and second image processing apparatuses, the first and second image processing apparatuses including: a sortation memory portion provided in a form of a virtually sorted, prescribed memory area to store sorted information; an information adding portion adding additional information to the sortation memory portion; an identification information production portion producing identification information identifying information stored in the sortation memory portion having the additional information added thereto; a transmission portion transmitting to the first image processing apparatus the identification information produced by the identification information production portion; a reception portion receiving identification information transmitted by the transmission portion from the second image processing apparatus; a first storage portion driven by the additional information added by the information adding portion to the sortation memory portion to store to the sortation memory portion the identification information received by the reception portion from the second image processing portion; a select portion selecting the identification information stored by the first storage portion to the sortation memory portion; a request portion driven by the identification information selected by the select portion to request information stored in the second image processing apparatus at the sortation memory portion; a return notification portion operative in response to a request from the first image processing apparatus by the request portion to return to the first image processing apparatus the information stored in the sortation memory portion; and a second storage portion storing to the sortation memory portion the information returned by the return notification portion from the second image processing portion.

Thus boxes corresponding to sortation memory portions of the same name produced in networked image processing apparatuses, respectively, can be shared as if they were a single box. Furthermore, information present in a box within a different, remote image processing apparatus can be readily obtained.

The present invention in still another aspect provides an image information communication system including an image processing apparatus and a communication terminal, the image processing apparatus including: a sortation memory portion provided in a form of a virtually sorted, prescribed memory area to store sorted information; a notification portion notifying the communication terminal of identification information used to identify information stored in the sortation memory portion; an instruction reception portion receiving a printing instruction from the communication terminal; and a transmission portion driven by the printing instruction received by the instruction reception portion from the communication terminal to transmit to a different image processing apparatus the information stored in the sortation memory portion.

Thus boxes corresponding to sortation memory portions of the same name produced in networked image processing apparatuses, respectively, can be shared as if they were a single box. Furthermore, information present in a box within a different, remote image processing apparatus can be readily printed out.

The present invention in still another aspect provides an image information processing method including the steps of: adding additional information to a sortation memory portion provided in a form of a virtually sorted, prescribed memory area to store information sorted by each prescribed condition for the prescribed condition; acquiring from a different image processing apparatus information including additional information; comparing the additional information acquired from the different image processing apparatus at the step of acquiring with the additional information added to the sortation memory portion at the step of adding, and displaying similar additional information; and selectively registering one of the additional information displayed at the step of comparing and displaying and the additional information added to the sortation memory portion at the step of adding.

Thus boxes corresponding to sortation memory portions of the same name produced in networked image processing apparatuses, respectively, can be shared as if they were a single box. Furthermore, in effect, single information of an original can be held on the network, and unnecessary consumption of storage capacity can be avoided.

The present invention in still another aspect provides the image processing method including the steps of: adding additional information to a sortation memory portion provided in a form of a virtually sorted, prescribed memory area to store sorted information; acquiring from a different image processing apparatus information including additional information; comparing the additional information acquired from the different image processing apparatus at the step of acquiring with the additional information added to the sortation memory portion at the step of adding; and registering the additional information added to the sortation memory portion at the step of adding, as based on a result of a comparison made at the step of comparing.

Thus boxes corresponding to sortation memory portions of the same name produced in networked image processing apparatuses, respectively, can be shared as if they were a single box.

The present invention in still another aspect provides the image processing method including the steps of: registering information with a sortation memory portion provided in a form of a virtually sorted, prescribed memory area storing information of an original sorted by identification information; notifying a different image processing apparatus of information registered at the step of registering; acquiring from the different image processing apparatus the information of the original sorted stored in the different image processing apparatus's sortation memory portion having registered therewith information identical to that imparted at the step of notifying; and storing to the sortation memory portion the information of the original acquired from the different image processing apparatus at the step of acquiring.

Thus boxes corresponding to sortation memory portions of the same name produced in networked image processing apparatuses, respectively, can be shared as if they were a single box. Furthermore, information present in a box within a different, remote image processing apparatus can be readily printed out.

The present invention in still another aspect provides the image processing method including the steps of: detecting that additional information added to an image of an original is at least partially designated; erasing from a sortation memory portion the additional information detected as having been designated at the step of detecting and information of the original having the additional information added thereto, the sortation memory portion being a virtually sorted, prescribed memory area storing information of an original sorted by additional information added to an image of the original; and notifying a different image processing apparatus of the additional information erased at the step of erasing.

Thus boxes corresponding to sortation memory portions of the same name produced in networked image processing apparatuses, respectively, can be shared as if they were a single box. Furthermore, a different image processing apparatus can also have appropriate additional information erased therefrom.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows a specific example of a box registered with an image processing apparatus 1b and stored to its storage device 12.

FIG. 12 shows a specific example of a box registered with image processing apparatus 1c and stored to its storage device 12 when a new box is registered therewith and stored to its storage device.

FIG. 13 shows a specific example of a box registered with mobile equipment 4 when mobile equipment 4 is used to register a box with image processing apparatus 1 and store it to storage device 12.

FIGS. 14-16 each shows a specific example of a registration operation screen.

FIG. 17 shows a specific example of an erasure operation screen.

DESCRIPTION OF THE PREFERRED EMBODIMENTS

Figure 1:
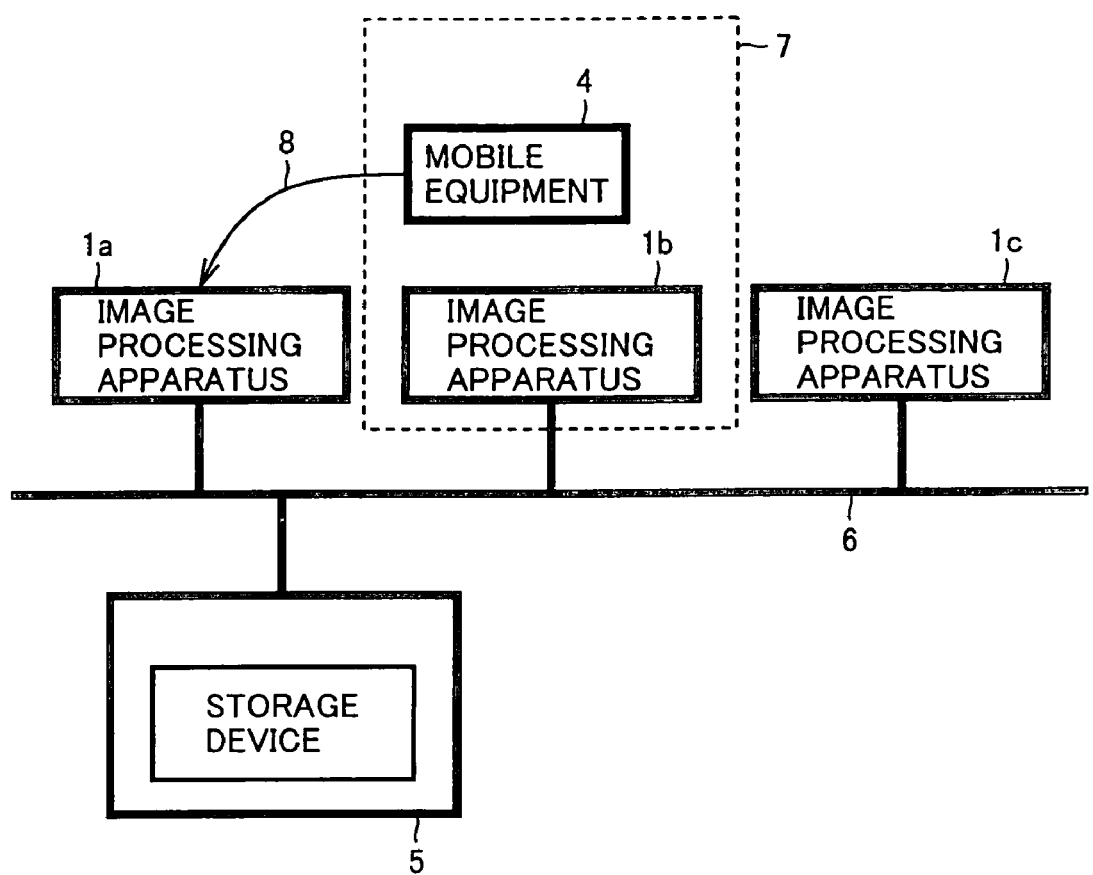
FIG. 1 shows a specific example of a configuration of a system using an image processing apparatus in the present embodiment.

Hereinafter reference will be made to the drawings to describe the present invention in embodiment. In the following description, like components are denoted by like reference characters. Their names and functions are accordingly identical. Accordingly their detailed description will not be repeated.

With reference to FIG. 1, a system using an image processing apparatus of the present embodiment includes image processing apparatuses 1a, 1b, 1c (hereinafter representatively referred to as an image processing apparatus 1) connected to a network 6, and a server 5 connected to network 6 and having a storage device.

Image processing apparatus 1 communicates with a different image processing apparatus and transmits or receives a variety of information through network 6.

Network 6 may be a network using a local area network (LAN) or other similar dedicated line, a network using a general line, or a network via radio communication.

Figure 2:
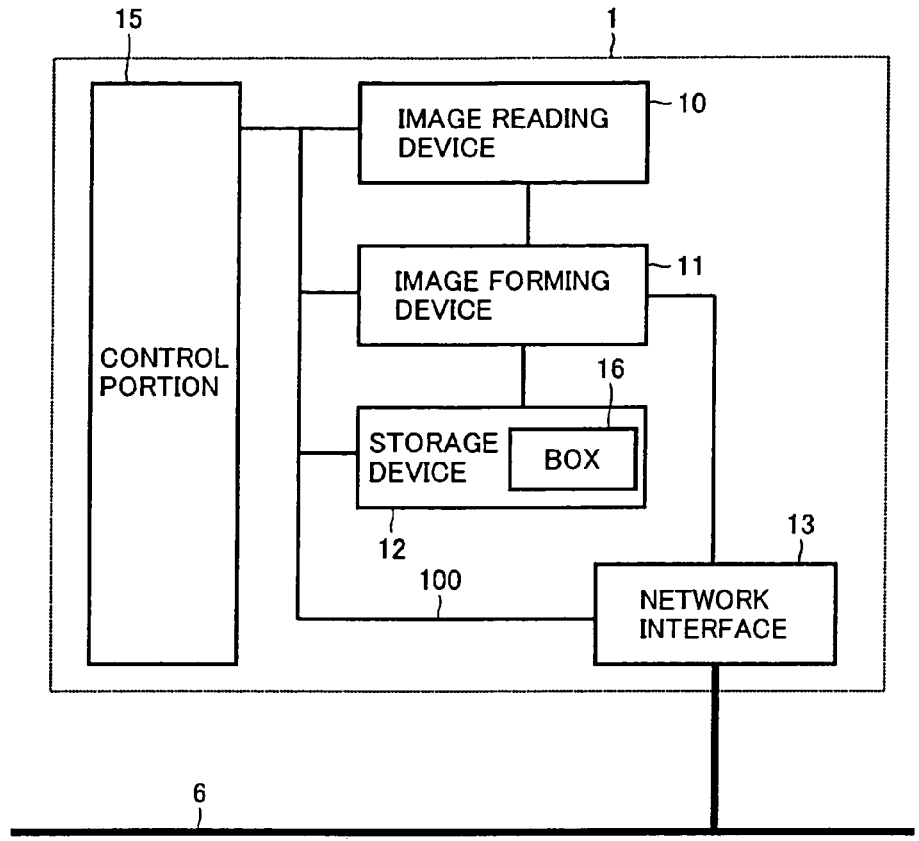
FIG. 2 is a block diagram showing a specific example of a configuration of an image processing apparatus 1.

Then with reference to FIG. 2, image processing apparatus 1 is controlled by a control portion 15 to read an image from an original, a photograph or the like via a scan device or other similar image reading device 10. The image read by image reading device 15 can be passed to and printed out by an image forming device 11. Furthermore the image read by image reading device 15 can be stored to a box 16 possessed by a storage device 12.

Image forming device 11 prints out data stored in box 16 possessed by storage device 12. Furthermore image forming device 11 outputs information of the image read by image reading device 10 to another image processing apparatus via a network interface 13.

Box 16 possessed by storage device 12 is a region of storage device 12 that is sectioned for each individual or department. It indicates a region within storage device 12 that corresponds to the individual or department and stores information sorted for each individual or department.

Network interface 13 transmits the data in box 16 possessed by storage device 12, additional information of box 16 input or the like via network 16 to another image forming device. The box's additional information includes the box's name (hereinafter referred to as a "box name"). Note that in the following description when a box name is referred to it may include information other than a box name corresponding to additional information of the box of interest.

Control portion 15 controls image reading device 10, image forming device 11, storage device 12 and network interface 13, and they are connected by an address and data bus 100.

Storage device 12 stores information communicated on network 6 and image information read by image reading device 10. Furthermore, storage device 12 includes the aforementioned box 16 to classify and sort communicated information, image information or the like for each individual or department and store the sorted information thereto. If different image processing apparatuses 1 have box 16 of the same name, any of the different image processing apparatuses 1 can freely use the sorted information within box 16 of the same name possessed by another one of the different image processing apparatuses 1.

Image processing apparatus 1 registers box 16 with storage device 12 and adds additional information to each registered box 16. Furthermore, image processing apparatus 1 (e.g., image processing apparatus 1a) notifies a prescribed image processing apparatus 1 (e.g., image processing apparatus 1b) of the additional information added to box 16.

The prescribed image processing apparatus 1 having been notified from image processing apparatus 1 of the additional information added to box 16 stores additional information of all boxes 16 registered with its storage device 12 and when it receives a request from a different image processing apparatus 1 it returns the additional information of all boxes 16.

For example, with reference to FIG. 1, if image processing apparatuses 1a-1c are each installed in a different office, a user in an office 7, which has image processing apparatus 1b installed therein, can use mobile equipment 4 to indicate additional information including a box name of box 16 registered with image processing apparatus 1a and stored to its storage device 12 and information related to sorted information stored in box 16 (hereinafter, sorted information stored in box 16 will be referred to as "original data") so as to allow another image processing apparatus 1b to directly output the original data of box 16 registered with image processing apparatus 1a and stored to its storage device 12. Furthermore, mobile equipment 4 can also be used for example to register a box with image processing apparatus 1, server 5 or the like and erase the box.

Note that mobile equipment 4 includes a communication function and a storage means and corresponds to mobile phones, personal digital assistants (PDAs), personal notebook computers and the like. They have general configurations and will not be described specifically.

Mobile equipment 4 notifies image processing apparatus 1 of information excluding original data. As such, the information has a small amount of data and preferably it is imparted from mobile equipment 4 to image processing apparatus 1 by radio communication 8. Furthermore, image processing apparatus 1 notifies image processing apparatus 2 of original data having a size of an amount of data that generally corresponds to image data. Accordingly, image processing apparatus 1 notifies image processing apparatus 2 preferably through optical fiber communication, which is different in manner from communication 8.

Server 5 stores in a storage device all of additional information of box 6 included in image processing apparatus 1 and data possessed in box 16. Server 5 returns additional information of box 16 requested by image processing apparatus 1 and data held in that box 16. If server 5 possesses the above described information, image processing apparatus 1 may not store a box name or data possessed by a box.

Note that server 5 is constructed by using for example a general personal computer and includes a keyboard or a similar input function to allow the box 16 name to be input. The remaining configuration of server 5 will herein not be described in detail.

Server 5 notifies image processing apparatus 1 of an input box name and in image processing apparatus 1 a registration process is effected in accordance with a registration sequence, which will be described hereinafter. Furthermore, server 5 may receive a box name input in a method similar to a method of operating image processing apparatus 1, as will be described hereinafter, or any other methods. For example, the server may receive a name input on a keyboard for example of personal computer (not shown) connected to network 6 to provide further convenience.

Figure 3:
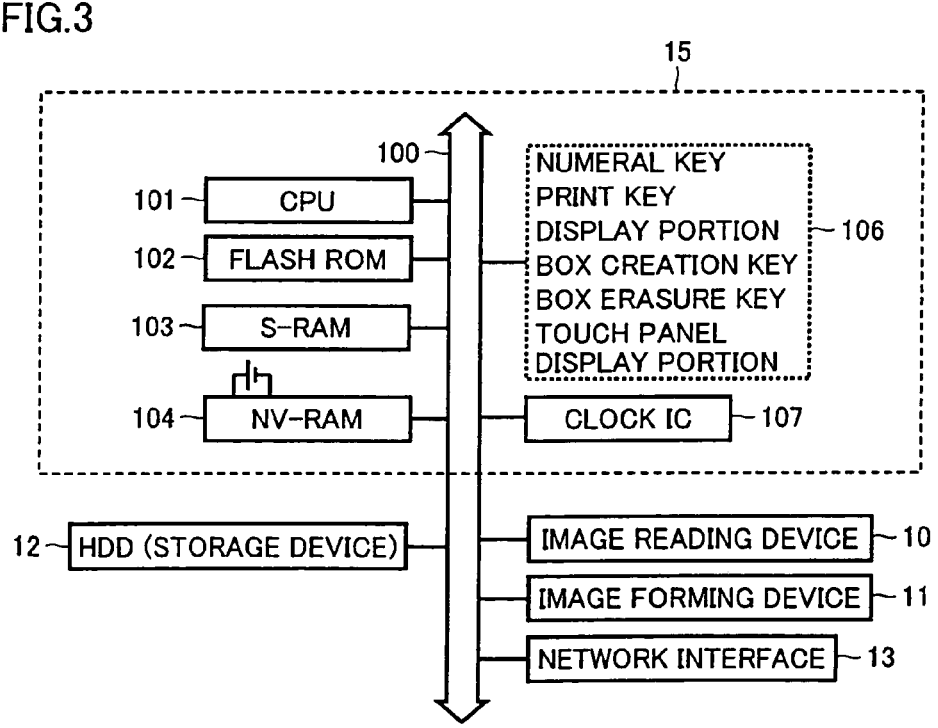
FIG. 3 shows a specific example of a configuration of a control portion 15 of image processing apparatus 1.

With reference to FIG. 3, control portion 15 includes a central processing unit (CPU) 101 executing a program, a flash read only memory (Flash ROM) 102 storing firmware thereof, a working, static random access memory (S-RAM) 103, a non-volatile RAM (NV-RAM) 104 backed up by a battery and storing various types of set values, a console panel 106, a clock integrated-circuit (clock IC) 107 counting time, and an address and data bus 100 connecting these components and devices together.

Address and data bus 100 has connected thereto storage device 12 formed for example of an HDD storing image information and information related to the image information, image reading device 10, image forming device 11 and network interface 13.

Figure 4:
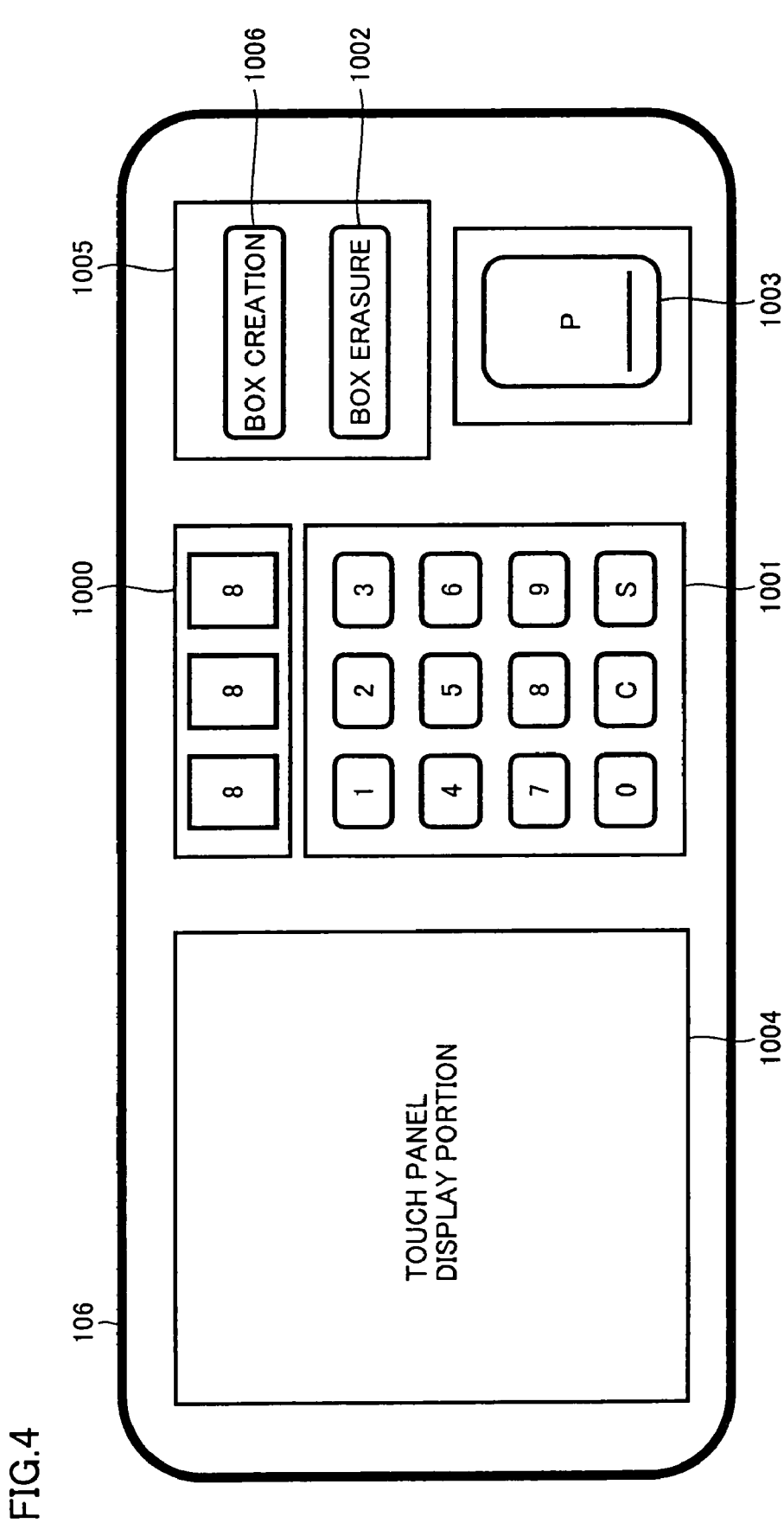
FIG. 4 shows a specific example of a console panel 106.

Furthermore with reference to FIG. 4 console panel 106 includes a touch panel display portion 1004 allowing a box name to be input and a different image processing apparatus's box name to be displayed or registered, a copy count display portion 1000 displaying a copy count set when image processing apparatus 1 is operated to make a copy, keys 1001 including a numeral key pressed to set a copy count, a CLEAR (C) key pressed to erase a set copy count, a STOP (S) key suspending a copy operation and other keys, a PRINT key 1003 pressed to input an instruction to start a copy operation, a console area 1005 starting a box creation or erasure operation, a box creation key 1006 pressed to create a new box 16, and a box erasure key 1002 pressed to erase box 16 present in storage device 12.

On console panel 106 when box creation key 1006 is pressed on touch panel display portion 1004 displays a registration operation screen for registering a new box. Furthermore, when box erasure key 1002 is pressed on touch panel display portion 1004 displays an erasure operation screen for erasing a box. The registration and erasure operation screens will be described hereinafter with reference to a specific example.

The present image processing apparatus performs a process in a flow, as will be described hereinafter with reference to a sequence diagram (FIGS. 5-9). Initially will be described a process effected to register a new box 16 with image processing apparatus 1 and store it to storage device 12.

[New-Box Creation Sequence 1]

Figure 5:
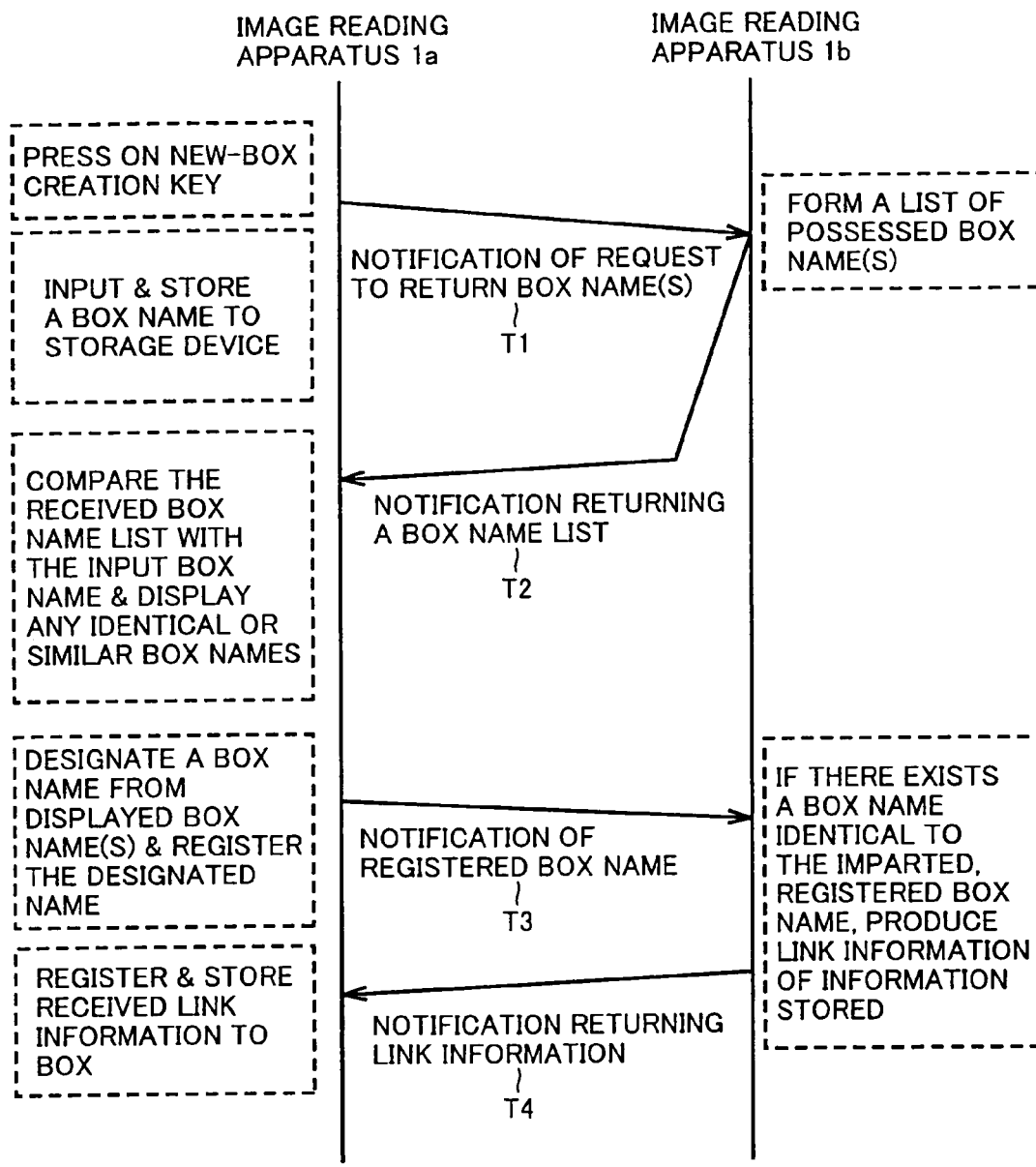
FIG. 5 represents a first new-box creation sequence.

A new-box creation sequence is shown specifically as a first new-box creation sequence by way of example in FIG. 5. In this sequence when a new box is to be registered with image processing apparatus 1a all box names possessed by another image processing apparatus 1b are obtained and before registration whether there exists an identical or similar box name is confirmed.

In FIG. 5, image processing apparatus 1a is operated by a user to register box 16. Image processing apparatus 1b notifies image processing apparatus 1a of a box name possessed by image processing apparatus 1b or notifies image processing apparatus 1 of link information of original data present in a box existing in apparatus 1b and having a box name identical to that which apparatus 1a has registered.

Furthermore, image processing apparatus 1b has on network 6 an address previously registered with image processing apparatus 1a. This address is registered, as will be described hereinafter. Note that image processing apparatus 1a may receive address information of image processing apparatus 1b previously registered with server 5 and register the same.

With reference to FIG. 5, a user of image processing apparatus 1a presses on box creation key 1006. In response, image processing apparatus 1a, which will create a new box, transmits notification T1 to image processing apparatus 1b. Notification T1 is a request to return a box name(s) for obtaining the same from a different image processing apparatus.

Image processing apparatus 1a having box creation key 1006 pressed on displays a registration operation screen on touch panel display portion 1004 and the user can perform an operation to input a box name and determine and register a name. The operation to determine a name adds to a box additional information corresponding to a box name. The registration operation screen will be described hereinafter with reference to a specific example. When the user presses the registration operation screen at a name decision key a box name possessed by a different image processing apparatus has is displayed. When the user presses the registration operation screen at a name registration key an input box name can be registered without confirming any box names that a different image processing apparatus has.

Image processing apparatus 1b receives notification T1 from image processing apparatus 1a and in response forms a list of names of boxes possessed by image processing apparatus 1b stored at its storage device 12 and returns the box name list to image processing apparatus 1a by return notification T2. The returned name list includes the box names possessed by image processing apparatus 1b and each box's registration date and time.

Note that image processing apparatus 1b may create a box name list at a time other than when notification T1 is received. Image processing apparatus 1b may produce the list any time as long as box names possessed by image processing apparatus 1b can be returned to image processing apparatus 1a.

For example, box names possessed by image processing apparatus 1b may be imparted, one box for each communication. Thus from image processing apparatus 1b to image processing apparatus 1a a plurality of communications may be effected to notify image processing apparatus 1a of all box names.

Furthermore as a box's additional information a box name may be replaced with a code or abbreviation attached for each box. Note that if a box's additional information is a code or abbreviation, the code or abbreviation is set by a user whenever a box is registered.

The code, as specifically exemplified, is preferably a unique code such as an employee code. Furthermore, the abbreviation, as specifically exemplified, is preferably converted to a short name associatable with an input name, such as an abbreviation formed by a portion of the name of interest and thus transmitted. For example, for the name "Production Department 1," an abbreviation such as "Production," "P1" "PD" or the like is preferable.

Furthermore, for each box, information of a date and time at which the box was registered is preferably included in the box's additional information.

When image processing apparatus 1a receives return notification T2 from image processing apparatus 1b, image processing apparatus 1a allows touch panel display portion 1004 to display all of received box names on a registration operation screen displayed before a box name is input. The user inputs a box name on the registration operation screen and presses the name decision key. In response, a received box name that is identical or similar to the input name is extracted and displayed. Preferably, a box name that has been registered during a prescribed period of time (for example within one month) as counted from a date of the registration operation is extracted and displayed. Thus comparing a registration date and time included in a box's additional information can narrow down candidates to help to rapidly register a new box name. Furthermore, a new box having an identical box name can also be created correctly.

Note that if image processing apparatus 1a receives return notification T2 from image processing apparatus 1b after a user inputs a box name and presses the name decision key, then when image processing apparatus 1a receives return notification T2 from image processing apparatus 1b image processing apparatus 1a extracts from return notification T2 a box name identical or similar to the input name and displays it on the registration operation screen.

The user confirms a candidate box name displayed on the registration operation screen and presses the name registration key or numeral key 1001 indicating a candidate's number. In response, a new box name is registered and a new box is registered with image processing apparatus 1a and stored to its storage device 12.

When a new box is thus registered with image processing apparatus 1a and stored to its storage device 12, image processing apparatus 1a transmits to image processing apparatus 1b information indicating that the new box has been registered, by notification T3 including a registered box name.

Image processing apparatus 1b receives notification T3 from image processing apparatus 1a and determines whether it has a box having a name identical to the box name received from image processing apparatus 1a. If image processing apparatus 1b has stored in its storage device 12 a box having an identical name, image processing apparatus 1b produces link information having three pieces of information, i.e., additional information including the box name of the box having the identical name, the apparatus's address (e.g., IP address) on a network, and the original data's name, and returns the produced link information to image processing apparatus 1a by return notification T4. Thus in referencing information stored in a box of a different image processing apparatus, link information including identification information identifying the information stored in the different apparatus's box and information indicative of the location can be transmitted to significantly further reduce a communication load and thus prevent it from increasing than when the information stored in the different apparatus's box is exactly transmitted.

Image processing apparatus 1a receives return notification T4 from image processing apparatus 1b and stores the received link information to the new, registered box having the same name as a box name included in return notification T4. Thus the address of image processing apparatus 1b having registered therewith a box having the same box name added thereto, is registered with image processing apparatus 1a.

Note mobile equipment 4 can be used to register a new box with image processing apparatus 1a through the FIG. 5 sequence in the same manner except that image processing apparatus 1a is replaced with mobile equipment 4. More specifically, mobile equipment 4 has a box creation key, which is pressed on by a user to transmit notification T1 to image processing apparatus 1b to request it to return a box name for obtaining the same from a different image processing apparatus to display it at mobile equipment 4. Note that mobile equipment 4 has a console panel including the equipment's box creating key, as will be described later with reference to a specific example.

Mobile equipment 4 having the box creation key pressed on, as described above, displays a registration operation screen and the user can perform an operation to input and determine a box name and register the name. On the registration operation screen a name decision key is pressed and a box name possessed by a different image processing apparatus is in response displayed. Furthermore on the registration operation screen a name registration key can be pressed to register an input box name without confirming a box name possessed by a different image processing apparatus.

Image processing apparatus 1b receives notification T1 from mobile equipment 4, and in response forms a list of names of boxes held in image processing apparatus 1b at its storage device 12 and returns the list by return notification T2 to mobile equipment 4. The returned name list includes box names that image processing apparatus 1b has and each box's registration date and time.

Note that image processing apparatus 1b may create a box name list at a time other than when notification T1 is received. Image processing apparatus 1b may produce the list any time as long as box names possessed by image processing apparatus 1b can be returned to mobile equipment 4.

For example, box names possessed by image processing apparatus 1b may be imparted, one box for each communication. Thus from image processing apparatus 1b to mobile equipment 4 a plurality of communications may be effected to notify mobile equipment 4 of all box names.

Furthermore as a box's additional information a box name may be replaced with a code or abbreviation attached for each box. Note that if a box's additional information is a code or abbreviation, the code or abbreviation is set by a user whenever a box is registered.

The code, as specifically exemplified, is preferably a unique code such as an employee code. Furthermore, the abbreviation, as specifically exemplified, is preferably converted to a short name associatable with an input name, such as an abbreviation formed by a portion of the name of interest, and thus transmitted. For example, for the name "Production Department 1," an abbreviation such as "Production," "P1" "PD" or the like is preferable.

Furthermore, if a box's additional information includes the code, image processing apparatus 1b may notify mobile equipment 4 of both a box name and the code. In that case, the box name as well as the code are transmitted, and image processing apparatus 1b thus communicates increased data to mobile equipment 4. However, mobile equipment 4 having received the data can use the code to conduct a search. The search can thus be readily conducted.

Mobile equipment 4 having received return notification T2 from image processing apparatus 1b displays the received box name(s) on the registration operation screen. Then on the screen a box name is input and the name decision key is pressed. In response, a received box name that is identical or similar to the input name is extracted and displayed.

Note that if mobile equipment 4 receives return notification T2 from image processing apparatus 1b after a user inputs a box name and presses the name decision key, then when mobile equipment 4 receives return notification T2 from image processing apparatus 1b mobile equipment 4 extracts from return notification T2 a box name identical or similar to the input name and displays it on the registration operation screen.

The user confirms a candidate box name displayed on the registration operation screen and presses the name registration key or numeral key 1001 indicating a candidate's number. In response, a new box name is registered with image processing apparatus 1*a* and stored to its storage device 12.

When a box is thus registered with image processing apparatus 1*a* and stored to its storage device 12, mobile equipment 4 transmits to image processing apparatus 1*b* information indicating that the new box has been registered, by notification T3 including a registered box name.

Image processing apparatus 1*b* receives notification T3 from mobile equipment 4 and determines whether it has a box having a name identical to the box name received. If image processing apparatus 1*b* has stored in its storage device 12 a box having an identical name, image processing apparatus 1*b* produces link information having three pieces of information, i.e., additional information including the box name of the box having the identical name, the apparatus's address on a network, and the original data's name, and returns the produced link information to mobile equipment 4 by return notification T4.

Mobile equipment 4 receives return notification T4 from image processing apparatus 1*b* and stores the received link information to the new, box registered with image processing apparatus 1*a* that has the same name as a box name included in return notification T4.

Note that while the FIG. 5 sequence has been described above with image processing apparatus 1*a* replaced by mobile equipment 4, after mobile equipment 4 is operated to input a box name image processing apparatus 1*a* may be notified of the input box name by mobile equipment 4 and may perform that portion of the FIG. 5 process subsequent to inputting the box name. More specifically, after mobile equipment 4 is operated to input a box name the FIG. 5 image processing apparatuses 1*a* and 1*b* sequence can be started at transmitting notification T1. The sequence subsequent to the transmission of notification T1 will not be described as it has been described hereinabove.

Furthermore, performing a sequence similar to the above described sequence allows server 5 to also have a new box registered therewith.

In the present image processing apparatus the above described new-box creation sequence 1 allows image processing apparatus 1*a*, which is operated by a user for registration, to obtain from another image processing apparatus 1*b* all box names registered with apparatus 1*b* and display an identical or similar box name. Image processing apparatus 1*a* can thus be prevented from registering a box name identical to a box having been registered with image processing apparatus 1*b*. Furthermore if a user desires to intentionally register with image processing apparatus 1*a* a name identical to a box having been registered with another image processing apparatus 1*b* the user can correctly register the same box name.

Furthermore in the present image processing apparatus when the above described new-box creation sequence 1 is performed, complete information present in a box within another image processing apparatus existing at a remote location can be readily obtained without the necessity of inputting another apparatus's address.

[New-Box Creation Sequence 2]

Figure 6:
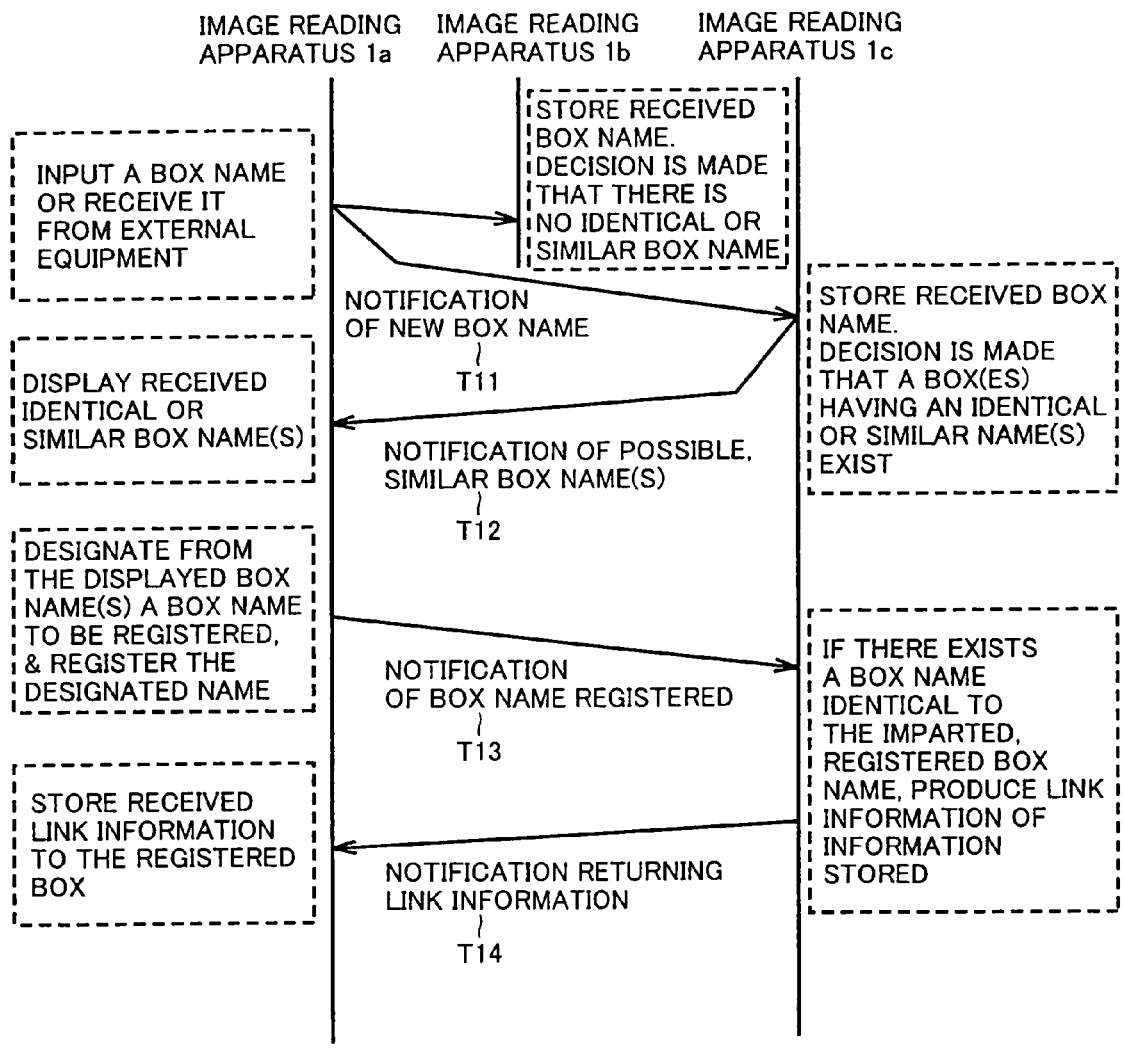
FIG. 6 represents a second new-box creation sequence.

As another specific example of the new-box creation sequence a second new-box creation sequence is shown in FIG. 6. The second new-box creation sequence allows a new box to be registered with image processing apparatus 1*a* after whether there exists in another image processing apparatus a box name identical or similar to an input box name is confirmed.

In FIG. 6, image processing apparatus 1*a* is operated by a user to register box 16 therewith. Image processing apparatus 1*b* transmits and receives information required in a process for registering a new box with image processing apparatus 1*a*.

With reference to FIG. 6, the user of image processing apparatus 1*a* presses box creation key 1006. In response, image processing apparatus 1*a* transmits new-box name notification T11 to image processing apparatuses 1*b* and 1*c* to request them to return any identical or similar box names.

Notification T11 may not be transmitted in response only to image processing apparatus 1*a* creating a new box. It may be transmitted in response to image processing apparatus receiving a new box name from external equipment. The external equipment corresponds for example to a personal computer equipped with a keyboard or any other similar input means and includes software displaying a registration operation screen. From this external equipment the input means is operated to input a box name and a name decision key is pressed on to transmit the input name to image processing apparatus 1*a*. Image processing apparatus 1*a* receives the name from the external equipment and in response similarly transmits notification T11 to image processing apparatus 1*b* and 1*c*.

In image processing apparatus 1*a* in response to box creation key 1006 pressed on touch panel display portion 1004 displays a registration operation screen and the user can perform an operation to input and determine a box name and register the name. On the registration operation screen a name decision key can be pressed to display a box name possessed by a different image processing apparatus. Furthermore on the registration operation screen a name registration key can be pressed to register an input box name without confirming any box names that a different image processing apparatus has.

Image processing apparatuses 1*b* and 1*c* receive notification T11 from image processing apparatus 1*a* and in response determine whether they have identical or similar box names stored in their respective storage devices 12. If so then the identical or similar box names are returned to image processing apparatus 1*a* together with each box's registration date by notification of possible, similar box name T12. Herein, the term "similar" corresponds for example for the name "Production Department 1" to "Production," "P1," "PD" or the like. Note that herein similarity can be determined by a method generally employed to determine similarity.

In FIG. 6, image processing apparatus 1*b* does not have any identical or similar box name stored in storage device 12. Accordingly, image processing apparatus 1*b* does not return notification T12. Furthermore in FIG. 6 image processing apparatus 1*c* has a box of an identical or similar name(s) stored in storage device 12. Accordingly, image processing apparatus 1*c* returns notification T12 to image processing apparatus 1*a*.

Image processing apparatus 1*a* receives notification T12 from image processing apparatus 1*c* and displays the received, possible, identical or similar box name(s) on a registration operation screen displayed on touch panel display portion 1004.

The user confirms the possible box name(s) displayed on the registration operation screen and presses a name registration key or numeral key 1001 indicating the number of a candidate box name to select it. Thus a new box name is registered with image processing apparatus 1*a* and stored to its storage device 12.

When image processing apparatus 1a has a new box registered therewith and stored to its storage device 12, image processing apparatus 1a transmits to image processing apparatus 1c information indicating that the new box has been registered, by notification including the registered box name T13.

Image processing apparatus 1c receives notification T13 from image processing apparatus 1a and in response determines whether it has a box having a name identical to the box name received from image processing apparatus 1a. If image processing apparatus 1c has a box of an identical name stored in storage device 12, image processing apparatus 1c produces link information having three pieces of information, i.e., additional information including the box name of the box having the identical name, the apparatus's address indicating its location on a network, and the original data's name, and returns the produced link information to image processing apparatus 1a by notification returning link information T14. Furthermore, if the box having the identical name has original data stored therein, the original data may be returned instead of the link information as notification T14.

Image processing apparatus 1a receives notification T14 from image processing apparatus 1c and stores the received link information to the box having a name identical to the box name included in notification T14, i.e., the new, currently registered box.

[Link Information Acquisition Sequence and Original-Data Acquisition Sequence]

Figure 7:
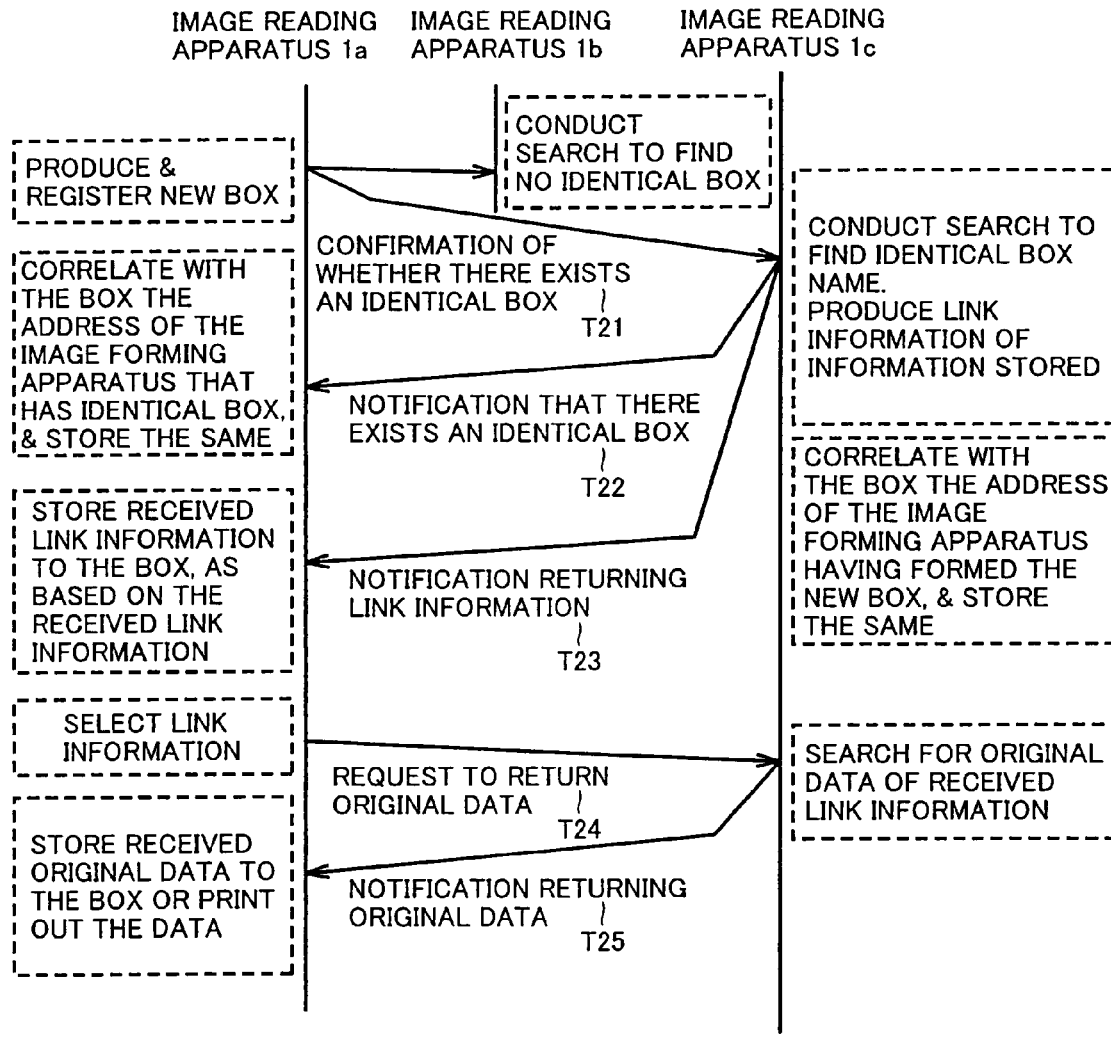
FIG. 7 represents a specific example of a sequence effected when a registration is made without confirming whether there exist any identical or similar box names.

FIG. 7 shows a specific example of a sequence effected to resister a box name without confirming whether there exist any identical or similar box names.

With reference to FIG. 7, a user of image processing apparatus 1a presses on the console panel 106 box creation key, inputs a name on a registration operation screen displayed on touch panel display portion 1004, and presses on a name registration key. In response, image processing apparatus 1a transmits to image processing apparatuses 1b and 1c a confirmation including the new registered box name for confirming whether there exist any identical boxes T21.

Image processing apparatus 1 receives confirmation T21 from image processing apparatus 1a and determines whether it has stored in its storage device 12 a box having a name identical to the box name included in confirmation T21. If not then the apparatus does not issue a return notification to image processing apparatus 1a. In FIG. 7, image processing apparatus 1b does not have stored in its storage device 12 a box having a name identical to the box included in confirmation T21. Accordingly, image processing apparatus 1b does not issue a return notification to image processing apparatus 1a.

Furthermore in FIG. 7 image processing apparatus 1c has stored in its storage device 12 a box having a name identical to the box name included in confirmation T21. Accordingly, image processing apparatus 1c notifies processing apparatus 1a by notification T22 that there exists an identical box. That an identical box exists in the image processing apparatus 1c storage device 12 is thus imparted. Furthermore, image processing apparatus 1c returns to image processing apparatus 1a link information by notification returning link information T23, or original data.

When image processing apparatus 1a detects that notification T22 is received from image processing apparatus 1c, image processing apparatus 1a correlates the address of the image processing apparatus having a box with a name identical to the new, created box name, i.e., the address of image processing apparatus 1c having transmitted notification T22, with the new created box and thus stores the same.

Furthermore when image processing apparatus 1a detects that notification T23 has been received from image processing apparatus 1c, image processing apparatus 1a stores received link information to a box identical to the box name included in the link information. Alternatively, when image processing apparatus 1a detects that notification T23 has been received from image processing apparatus 1c, image processing apparatus 1a stores received original data to a new created box.

Then when link information is designated in image processing apparatus 1a a request to return original data T24 is imparted to a destination of notification included in the link information (in FIG. 7, an image processing apparatus 1c). The link information is designated in image processing apparatus 1a in a method as will be described later with reference to a specific example.

Image processing apparatus 1c receives request T24 from image processing apparatus 1a and is driven by link information included in request T24 to search its storage device 12 for original data within a box and returns the original data by notification returning original data T25.

Image processing apparatus 1a receives notification T25 from image processing apparatus 1c and stores the received original data to a box having stored therein the link information transmitted by request T24. Note that image processing apparatus 1a can also print out the data on a sheet via image forming device 11, rather than store the data to a box.

[Box Erasure Sequence]

Figure 8:
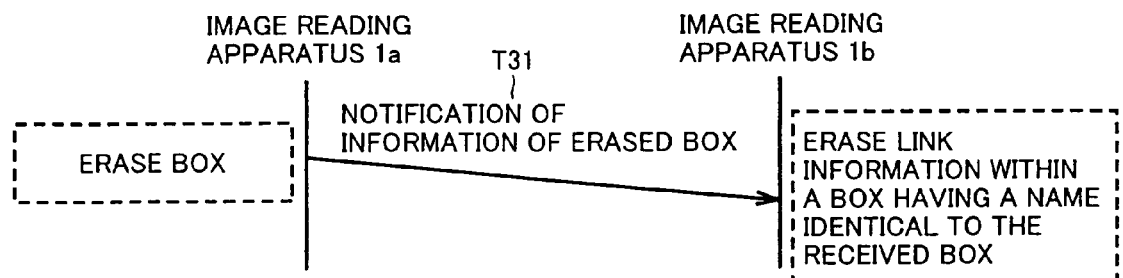
FIG. 8 represents a specific example of a sequence effected when a box registered with image processing apparatus 1 is erased.

With reference to FIG. 8, when a user of image processing apparatus 1a presses on box erasure key 1002 of console panel 106 image processing apparatus 1a transmits to a different image processing apparatus 1b notification of information including a box name to be erased T31.

Image processing apparatus 1b receives notification T31 from image processing apparatus 1a, and if image processing apparatus 1b has in its storage device 12 a box having added thereto a box name identical to that to be erased included in notification T31, image processing apparatus 1b erases link information stored in the box having the identical name that includes the received box name and has the address of image processing apparatus 1a.

When the present image processing apparatus effects the box erasure sequence, an erasure operation is being performed at image processing apparatus 1a while a different image processing apparatus 1b can be prevented from performing an excessive communication erroneously erasing link information free of original data. Furthermore, the sequence can also prevent a communication error from occurring in image processing apparatus 1b as a result of communication. Furthermore while an image processing apparatus has erased therefrom information stored in a box produced for each individual or department it is not necessary to perform an operation to erase related information present in a different image processing apparatus.

[Sequence of a Printing Instruction from Mobile Equipment 4]

Figures 9, 10:
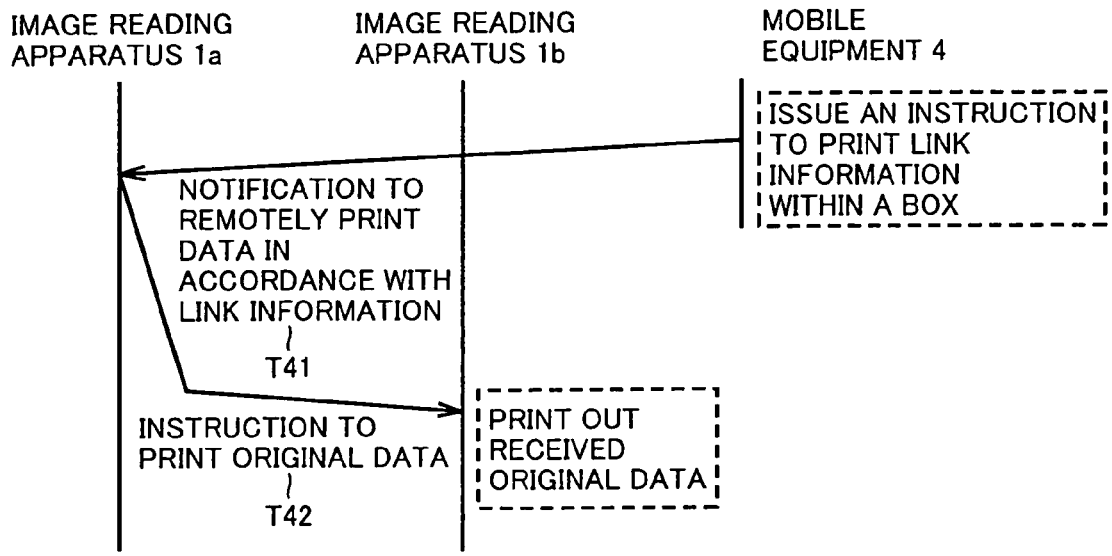
FIG. 9 represents a specific example of a sequence involving operating mobile equipment 4 to allow a nearest image processing apparatus to print out original data stored in a box held by an image processing apparatus existing at a different location.
FIG. 10 shows a specific example of a box registered with an image processing apparatus 1a and stored to its storage device 12.

Mobile equipment 4 is operated to allow original data stored in a box held by an image processing apparatus existing at a location to be printed out by a different, nearest image processing apparatus through a sequence. FIG. 9 shows a specific example of the sequence.

Mobile equipment 4 sets on its console panel the link information of original data to be printed out and an address of an image processing apparatus printing out the data, i.e., the image processing apparatus 1b address on a network and transmits to image processing apparatus 1a, which has the original data, by notification issued to remotely print out data in accordance with link information T41. Notification T41 is information including link information of original data and an address of an image processing apparatus printing out the original data. How mobile equipment 4 is operated to select information to be imparted will be described later with reference to a specific example.

Image processing apparatus 1a receives notification T41 from mobile equipment 4. From the original data's name and a box name included in the link information included in notification T41, image processing apparatus 1a determines original data stored in a box having a name identical to the box name. Note that original data to be determined is not limited to original data present in the image processing apparatus 1a storage device 12. Original data present for example in a different image processing apparatus 1 or server 5 may be determined via network 6.

Then image processing apparatus 1a transmits the original data and a printing instruction by an instruction to print original data T42 to the address of an image processing apparatus printing out the data, as included in notification T41, i.e., image processing apparatus 1b.

Image processing apparatus 1b receives instruction T42 from image processing apparatus 1a and prints out the original data included in instruction T42.

In the image processing apparatus the above described sequence allows a user of mobile equipment 4 working in an office having image processing apparatus 1b installed therein to print out via image processing apparatus 1b original data stored in a box of image processing apparatus 1a installed at a remote location such as a different office.

Furthermore in the present image processing apparatus the above sequence can eliminate a waiting time corresponding to an amount of data of information that elapses before the information is obtained from a remote location. Thus a user can use mobile equipment 4 such as mobile phone to instruct a nearest image processing apparatus to print out data and estimate when the data will completely be printed out so that the user can go to the image processing apparatus at his/her estimated time to pick up the printout and thus does not need to wait in front of the image processing apparatus for the data to be printed out. Furthermore, employing a mobile phone or other similar, familiar mobile equipment to operate the image processing apparatus can provide enhanced operability by user.

Information produced when the above described new-box creation sequence is effected will now be described with reference to a specific example of a box registered with image processing apparatus 1 and stored to its storage device 12, as shown in FIGS. 10-12.

With reference to FIG. 10, image processing apparatus 1a has stored in its storage device 12 ten boxes having box names "Suzuki," "Inoue," "Sakurai," "Yamaguchi," "Mori," "Namino," "Noguchi," "Saijo," "Asaka" and "Morimoto" attached thereto. Furthermore, each box has information of the box's registration date and time stored therein.

Furthermore, each box also has stored therein a box code corresponding to information that identifies the box. In the present system when a new box is created, image processing apparatus 1 attaches this box code automatically to the new created box, as counted from one successively. In the FIG. 10 example, boxes are registered from the box names "Suzuki" to "Morimoto" successively and box codes 1-10 are attached to the boxes successively. A box code may not be attached by image processing apparatus 1a automatically and may alternatively be set when a user registers a new box. For example, if a box code is input in the form of an employee number then instead of a box name the box code can be used as information for identify a box.

Furthermore each box may store therein data received from a different image processing apparatus and data read via image reading device 10. In FIG. 10, a box of box code 1 corresponding to the box name "Suzuki" has stored therein data received from a different image processing apparatus, which is data with "game result. TXT" serving as a file name corresponding to information that identifies the file, and a box of box code 3 corresponding to the box name "Sakurai" has stored therein files 1 and 2 of original data of an image read via image reading device 10.

Note that the box of box code 3 has stored therein "information of link to file 3," which is information of a link to a file 3 corresponding to original data stored in a box of the same box name "Sakurai" that a different image processing apparatus (image processing apparatus 1b in a specific example described later) has.

This information of the link to file 3 includes "the image processing apparatus 1b address on network," "file 3," which is a file name of a file of a destination of the link, and name of box stored this information of the link to file 3, i.e., "Sakurai." Such information of the link to file 3 is produced by image processing apparatus 1b when file 3 is stored to image processing apparatus 1b in the box having the box name "Sakurai." The produced information is transmitted to image processing apparatus 1a and stored thereto in the box having the box name "Sakurai."

Then, with reference to FIG. 11, image processing apparatus 1b has stored in storage device 12 five boxes having box names "Baba," "Sakaguchi," "S akurai," "Yamaguchi" and "Mori" attached thereto. Furthermore, each box has stored therein information of the box's registration date and time.

Furthermore, each box has stored therein a box code corresponding to information that identifies the box. In the present system when a new box is created a box code is attached automatically by image processing apparatus 1 from one successively. If a box name is registered with image processing apparatus 1b such that boxes are registered successively from that of the box name "Baba" while image processing apparatus 1a has a box, then image processing apparatus 1b when registering a box previously obtains the following number from image processing apparatus 1a via network 6 and attaches a box code to each box, starting at 11, successively.

Image processing apparatus 1b has registered therewith the box names "Sakurai," "Yamaguchi" and "Mori," which are identical to box names that image processing apparatus 1a has. Accordingly, the same box codes as those in image processing apparatus 1a are attached. These identical codes are attached in creating a box in image processing apparatus 1b by adopting a code transmitted from image processing apparatus 1a together with box name.

Furthermore, with reference to FIG. 11, the box with the box name "Sakurai" has stored therein file 3 corresponding to original data, information of a link to file 1, and information of a link to file 2. File 3 corresponding to original data is information stored after the box of interest is created, and the information of the link to file 1 and that of the link to file 2 are information obtained from image processing apparatus 1a in creating the box.

Then, with reference to FIG. 12, image processing apparatus 1c has stored in storage device 12 three boxes with box names "Matsuda," "Kaga" and "Esumi" attached thereto. The FIG. 12 example shows that storage device 12 in that state has therein a new box created with the box name "Sakurai"

attached thereto. Furthermore, each box has stored therein information of the box's registration date and time.

To register a box with image processing apparatus 1c, similarly as has been described for registering a box with image processing apparatus 1b, to successively register boxes starting from that with the box name "Matsuda" the following number is obtained via network 6 from image processing apparatuses 1a and 1b and box codes are attached successively from 20 to the boxes.

As the box with the box name "Sakurai" additionally registered with image processing apparatus 1c is identical to a box name possessed by image processing apparatuses 1a and 1b. Accordingly, a box code identical to that in image processing apparatuses 1a and 1b is attached. These identical codes are attached in creating a box in image processing apparatuses 1a and 1b by adopting a code transmitted from image processing apparatuses 1a and 1b together with box name.

Furthermore, with reference to FIG. 12, since the box with the box name "Sakurai" has additionally been created, it still does not have original data stored therein. However, it has stored therein the information of the link to file 1, that of the link to file 2, and that of the link to file 3. The information of the link to file 1 and that of the link to file 2 are information obtained from image processing apparatus 1a in creating the box and that of the like to file 3 is information obtained from image processing apparatus 1b.

FIG. 13 represents an example showing that mobile equipment 4 has a new box created in its storage device that has the box name "Sakurai" attached thereto by way of example.

With reference to FIG. 13, the new registered box with the box name "Sakurai" is identical to a box name possessed by image processing apparatuses 1a, 1b, 1c. Accordingly, a box code identical to that in image processing apparatuses 1a, 1b, 1c is attached. These identical codes are attached in creating a box in image processing apparatuses 1a, 1b, 1c by adopting a code transmitted from image processing apparatuses 1a, 1b, 1c together with box name.

Note that mobile equipment 4 registers a box with image processing apparatus 1 or erases a box from image processing apparatus 1 and stores to a box present in its storage device link information of original data. More specifically, with reference to FIG. 13, the box with the box name "Sakurai" has stored therein the information of the link to file 1, that of the link to file 2 and that of the link to file 3. The information of the link to file 1 and that of the link to file 2 are information obtained from image processing apparatus 1a in creating the box and that of the link to file 3 is information obtained from image processing apparatus 1b. As such, mobile equipment 4 is not required to have a large storage capacity, which can increase users' convenience.

While in the FIGS. 10-13 examples a box name is a user's individual name, it may be department name input. For example, if the box name "Sakurai" is replaced with a box name "Development Department" and files 1, 2 and 3 are used by all staff members of a development department for the sake of illustration, each image processing apparatuses 1a, 1b, 1c has the box "Development Department" and the staff members can use image processing apparatus 1 closest to their desks to use files 1, 2 and 3.

Image processing apparatus 1 is operated for each of the FIGS. 5-8 specifically exemplified sequences, as described hereinafter by referring to each operating screen specifically exemplified.

[Box Registration Operation]

In the FIG. 5 sequence when the FIG. 4 box creation key 1006 is pressed on image processing apparatus 1 transmits notification T1 a request to obtain a box name that a different image processing apparatus has. The FIG. 4 touch panel display portion 1004 displays a registration operation screen shown in FIG. 14.

Figure 14:
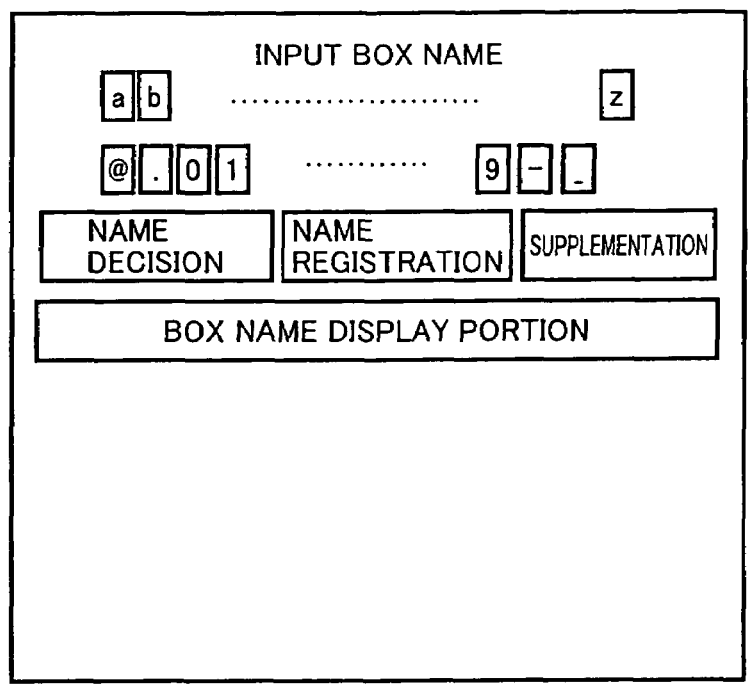

With reference to FIG. 14, the registration operation screen includes Roman alphabetical keys a-z, an @ key, a comma (shown as "," in FIG. 14) key, numeral keys, a minus (shown as "–" in FIG. 14) key and an underbar (shown as "_" in FIG. 14) key. These keys are used to input a box name. The input box name is displayed by a box name display portion.

Image processing apparatus 1 has a function to convert an alphabetical letter input via a Roman alphabetical key to Japanese and the box name display portion of FIG. 14 displays a letter that has been converted into Japanese. A Roman alphabetical letter is converted to Japanese by pressing S key 1001 shown in FIG. 4. Note that pressing S key 1001 allows the conversion function to function only when the FIGS. 14-16 screens are displayed. When these screens are not displayed, S key 1001 functions as a key indicating an instruction to stop a copy operation when it is pressed.

Then the user operates the registration operation screen to press on a name decision key to complete inputting a box name displayed on the box name display portion. Then image processing apparatus 1 stores an input box name to storage device 12-to use it as a keyword to be compared with in searching for any box names possessed by a different image processing apparatus that are possible, identical or similar box name.

Then the user operates the registration operation screen to press on a name registration key. Content displayed by the box name display portion is registered as a box name to complete creating a new box.

Furthermore, operating the registration operation screen to input a prescribed letter and subsequently press on a supplementation key allows a thereafter registered new box to have its box name followed by the input, prescribed letter to supplement the name. More specifically, a new box name registered thereafter is followed by information input by pressing on the supplementation key to supplement the name. For example, if the supplementation key is pressed on to input "_JP" as information as a supplement and if a thereafter registered box name is "Japan" then the name "Japan_JP" is applied in registering a new box.

Figure 15:
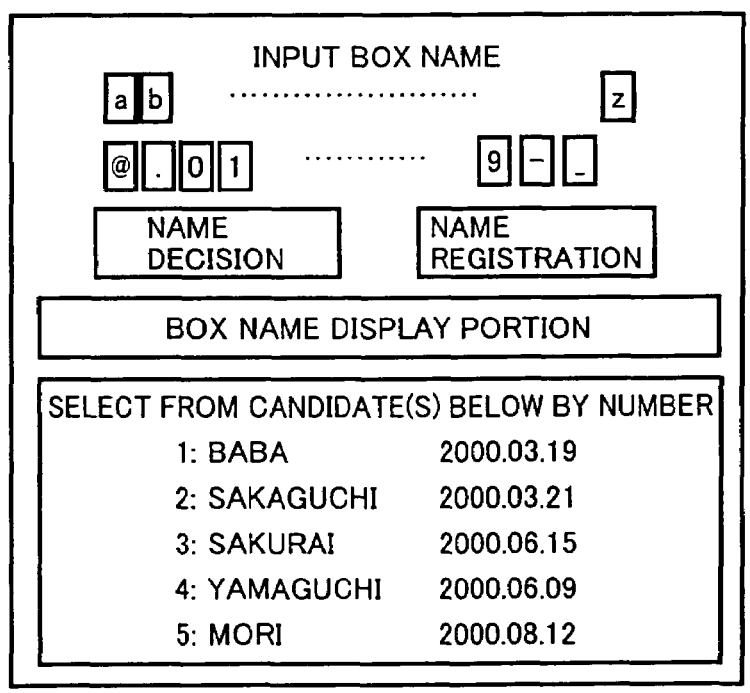

In performing the above described operation to register a new box when the FIG. 5 notification returning a box name list T2 is received from a different image processing apparatus the user can operate the FIG. 14 screen to press on the name registration key to switch the FIG. 14 screen to the FIG. 15 screen to display a box name(s) and each box's registration date included in notification T2 together with a number for selection. Thus displaying a box name received from a different image processing apparatus can prevent a user from erroneously inputting as a new box name a box name similar to that possessed by the different image processing apparatus.

When the FIG. 15 screen is operated to input a box name and press on the name decision key, the input box name is temporarily stored to storage device 12. Then the FIG. 15 screen switches to the FIG. 16 screen displaying a box name included in notification T2 received from the different image processing apparatus that is similar to a box name possessed by the different image processing apparatus. Note that FIG. 16 shows an example provided when the FIG. 15 screen is operated to input "Production Department 1" as a box name. A box name displayed at that time preferably displays a box name registered during a prescribed period of time (for example of one month) as counted from the date of the registration operation, as has been described previously, and on the FIG. 16 screen is shown a specific example of a registration operation screen displayed for performing the operation on May 1, 2001 and inputting "Production Department 1" as a box name.

On the FIGS. 15 and 16 screens a box name possessed by a different image processing apparatus that is identical or similar to an input box name and each box's registration date together with a number for selection. The registration date may be displayed to include a registration time, i.e., a registration date and time may be displayed.

By operating the FIG. 15 or 16 screen to press on the name registration key, a box is registered with an input box name. If a candidate box name displayed on the FIG. 15 or 16 screen is to be selected and registered, a displayed number is selected via numerical key 1001 shown in FIG. 4 to change a name to a selected box name for registration.

Note that for the FIG. 6 sequence when box creation key 1006 shown in FIG. 4 is pressed on, touch panel display portion 1004 displays the FIG. 14 screen. Then when the notification of a possible, similar box name T12 shown in FIG. 6 is received from a different image processing apparatus, the FIG. 14 screen switches to the FIG. 15 screen.

The FIG. 15 screen is operated to input a box name and presses on the name decision key. In response, the FIG. 15 screen switches to the FIG. 16 screen displaying a candidate box name included in notification T12 that is identical or similar to the input name. The FIG. 16 screen is operated to confirm the displayed candidate box name and press the name registration key or numeral key 1001 corresponding to the candidate's number to select it. In response, a box name is registered with image processing apparatus 1 and stored to its storage device 12. As image processing apparatus 1 now has a new box registered therewith and stored to its storage device 12, image processing apparatus 1 transmits to a different image processing apparatus the FIG. 6 notification of the registered box name T13 to impart the input box name.

Note that the FIG. 15 screen may be adapted to display a box name previously stored in image processing apparatus 1 currently operated and may be operated select a displayed box name by number to register a new box's name.

Furthermore on the FIGS. 15 and 16 screens a box name possessed by a different image processing apparatus that is identical or similar to an input box name and each box's registration date are displayed together with a number for selection. By operating the FIG. 15 or 16 screen to press on the name registration key, a box is registered with an input box name. If a candidate box name displayed is to be selected and registered, a displayed number is selected via numerical key 1001 shown in FIG. 4 to change a name to a selected box name for registration.

Note that for the FIG. 7 sequence when box creation key 1006 shown in FIG. 4 is pressed on, touch panel display portion 1004 displays the FIG. 14 screen. Then the FIG. 14 screen is operated to input a box name and press on the name registration key to register the input box name with image processing apparatus 1 and store it to the apparatus's storage device 12.

[Box Erasure Operation]

In the FIG. 8 sequence when box erasure key 1002 of FIG. 4 is pressed on image processing apparatus 1 transmits to a different image processing apparatus the notification of information of a box to be erased T31 and the FIG. 4 touch panel display portion 1004 displays an erasure operation screen shown in FIG. 17.

On the FIG. 17 screen the number of a box name to be erased is input via numeral key 1001 shown in FIG. 4 and an erasure key is pressed on to start the FIG. 8 erasure sequence.

[Operation at Mobile Equipment 4]

Figure 18:
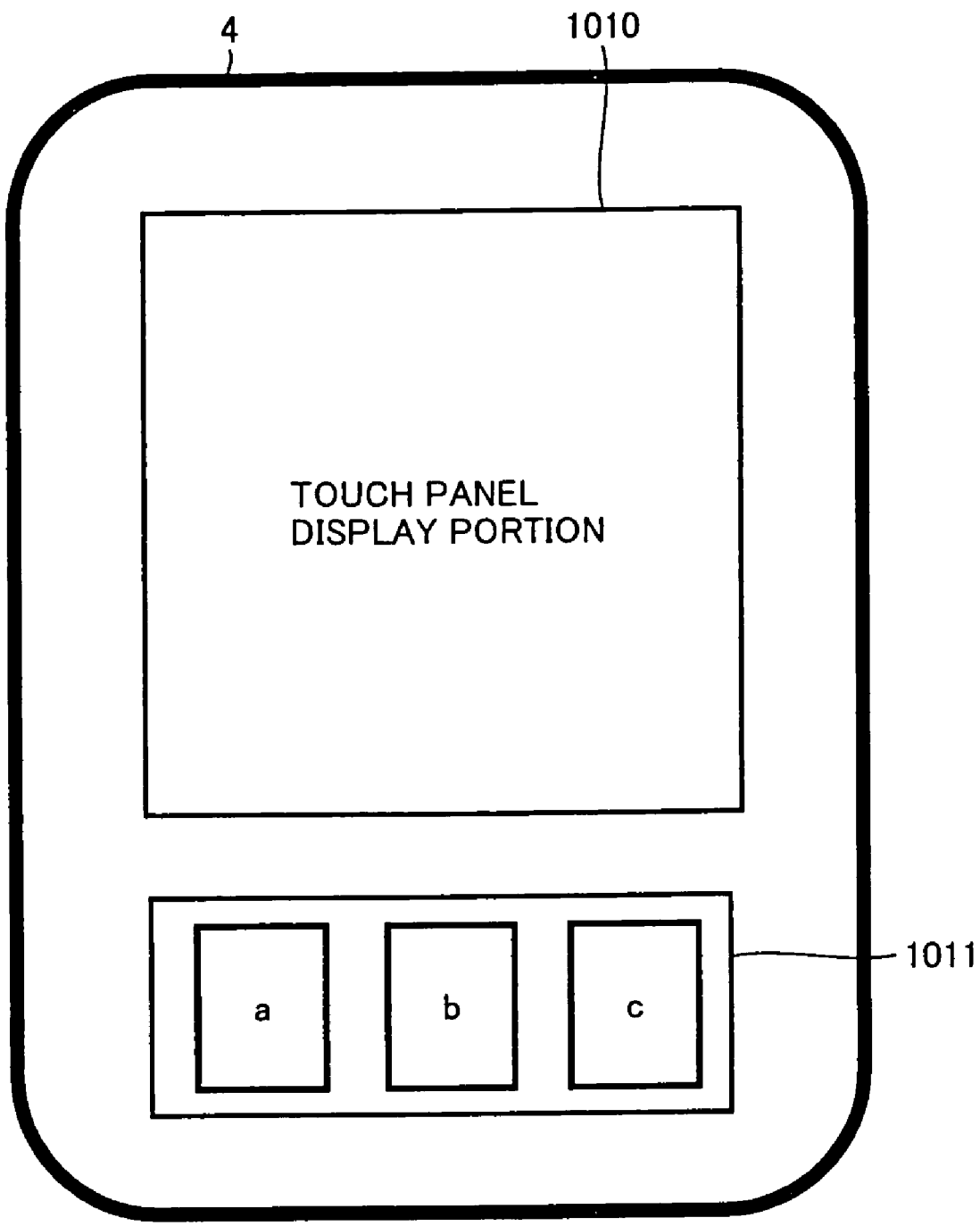
FIG. 18 shows a specific example of a console panel provided to mobile equipment 4.

With reference to FIG. 18, mobile equipment 4 has a console panel including a touch panel display portion 1010 and a group of keys 1011 and operated to input a box having data to be printed stored therein, data to be print, and an address of an image processing apparatus that prints out data.

The group of keys 1011 is used to register a box and input an instruction to start an instruction to print data. It includes an "a" key used to register a new box. In the FIG. 9 sequence when the FIG. 18 console panel is operated to press on the "a" key touch panel display portion 1010 displays a screen similar to the FIG. 14 registration operation screen displayed by the image processing apparatus 1 on touch panel display portion 1004. Similarly as has been described above for image processing apparatus 1, the user can operate a registration operation screen displayed on the mobile equipment 4 touch panel display portion 1010 to perform an operation to input and determine a box name and register the name.

Then the registration operation screen is operated to press on the name decision key to display a box name possessed by image processing apparatus 1. Furthermore the screen is operated to press on the name registration key to register an input box name without confirming the box name(s) possessed by image processing apparatus 1. Thereafter an operation similar to that described in the FIG. 5 sequence is performed.

Figure 19:
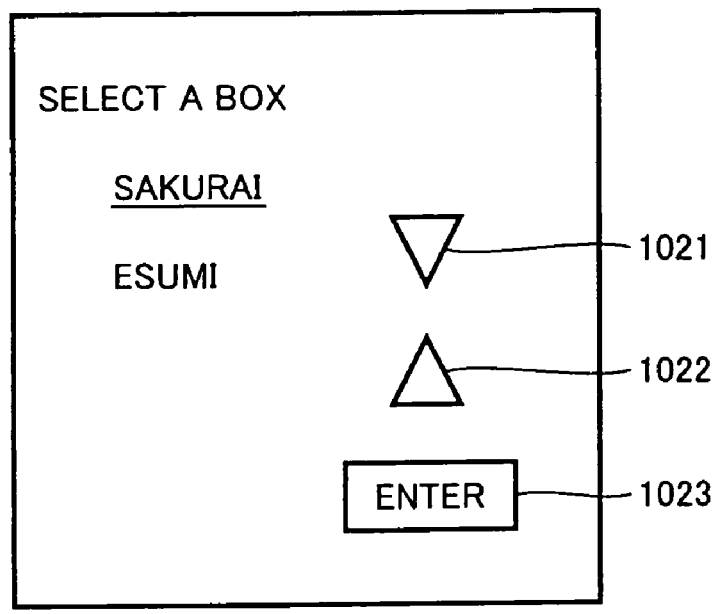
FIG. 19 shows a specific example of a printout operation screen.

The group of keys 1011 also includes a "b" key. When the "b" key is pressed on, the FIG. 14 screen displayed on touch panel display portion 1010 switches to a printout operation screen shown in FIG. 19 for allowing original data possessed by image processing apparatus 1a to be printed out by a different, nearest image processing apparatus 1b. With reference to FIG. 19, the printout operation screen includes keys 1021 and 1022 for making a selection and an ENTER key 1023 pressed to make a decision.

On the FIG. 19 screen key 1021 or 1022 is pressed on to select a name of a box having stored therein link information of data to be print. In the FIG. 19 example, the boxes with the box names "Sakurai" and "Esumi" registered by mobile equipment 4 with image processing apparatus 1a are selectably displayed. This example is a specific example corresponding to a specific example of a box registered with mobile equipment 4 when the equipment is used to register a box with image processing apparatus 1 and store it to the apparatus's storage device 12.

The FIG. 19.*screen*, as specifically exemplified, shows that the box name "Sakurai" displayed at the top is underlined, which indicates that the box name "Sakurai" has been selected. When key 1021 is pressed on with "Sakurai" selected, the underline moves to the box name "Esumi" and the box with the box name "Esumi" is selected. When key 1022 is pressed on with "Esumi" selected, the underline is again moved to the box name "Sakurai" and the box name "Sakurai" is again selected.

Figure 20:
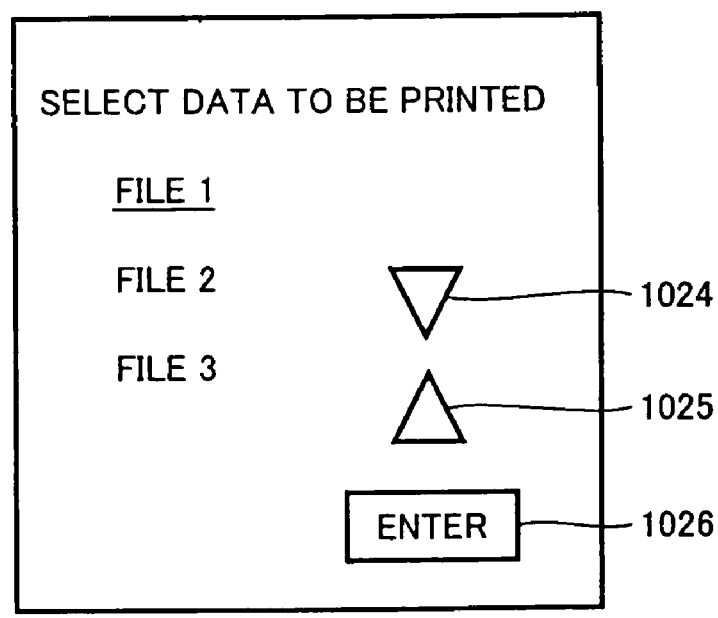
FIG. 20 shows a specific example of a screen operated to select data to be printed.

Then the FIG. 19 screen is operated to press on ENTER key 1023 to determine selection of a currently selected box. Then the FIG. 19 screen displayed on touch panel display portion 1010 switches to a screen operated to select data to be printed, as shown in FIG. 20, to display a name of a file of original data present in the selected box. With reference to FIG. 20, the screen operated to select data to be printed includes keys 1024 and 1025 for making a selection and an ENTER key 1026 operated to make a decision.

Note that data that can be stored to a box registered by mobile equipment 4 with image processing apparatus 1 (or server 5) is link information of original data, as has been described previously. As such, the FIG. 20 screen, as specifically exemplified, shows that the box with the box name "Sakurai" shown in FIG. 13 has been selected and entered by way of example and as data to be printed, files 1, 2 and 3 are selectably displayed.

The FIG. 20 screen, as specifically exemplified, shows file 1, displayed at the top, is underlined, which indicates that file 1 has been selected. When key 1024 is pressed on with file 1 selected, the underline moves to file 2 and file 2 is thus selected as data to be printed. When key 1025 is pressed on with file 2 selected as data to be printed, the underline is again moved to file 1 and file 1 is thus again selected.

Figure 21:
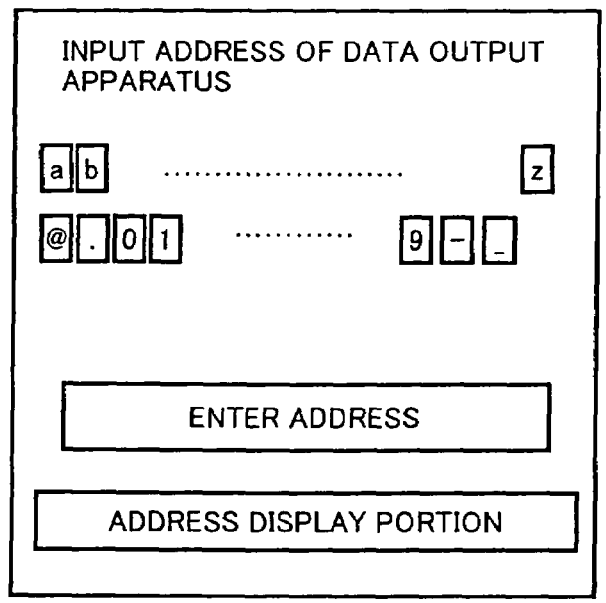
FIG. 21 shows a specific example of a screen operated to set an address of an apparatus that prints data.

Then the FIG. 20 screen is operated to press ENTER key 1026 to enter selection of a currently selected data name. Then the FIG. 20 screen displayed on touch panel display portion 1010 switches to a screen operated to set an address of an apparatus that prints out data, as shown in FIG. 21. With reference to FIG. 21, the screen operated to set an address of an apparatus that prints out data, as well as the FIG. 14 registration operation screen, includes Roman alphabetical keys a-z, an @ key, a, comma (,) key, numeral keys, a minus (−) key and an underbar (_) key pressed to input an address, an address decision key pressed to enter that an address has been determined, and an address display portion displaying an input address. On this screen a user performs an operation to input an address of image processing apparatus 1 that prints out data to be printed. The user then presses on the address decision key and mobile equipment 4 in response transmits the FIG. 9 notification issued to remotely print data in accordance with link information T41 to image processing apparatus 1*a* having stored therein original data corresponding to the data to be printed.

To implement each of the above described sequences, image processing apparatus 1 performs a process, as will be described with reference to the flow charts shown in FIGS. 22-26. The FIGS. 22-26 flow charts represent a process performed in image processing apparatus 1 by control portion 15 configured of CPU 101 reading firmware stored in Flash ROM 102 and developing it on S-RAM 103 for execution.

Figure 22:
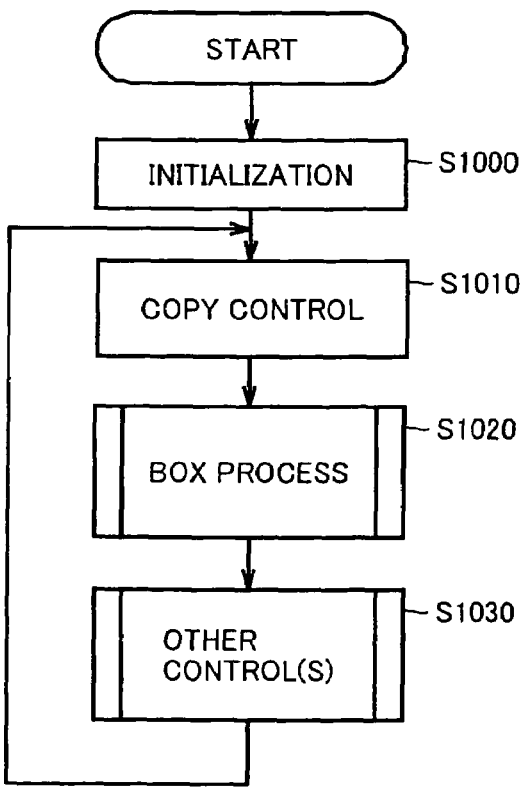
FIG. 22 is a flow chart representing a process effected in image processing apparatus 1.

The FIG. 22 process is started for example by plugging in image processing apparatus 1 or pressing a power supply button (not shown) to supply power.

With reference to FIG. 22, when the process starts, initially step (S) 1000 is performed to set an initial value of each set value of CPU 101 to allow addresses and data to be communicated for Flash ROM 102, S-RAM 103, NV-RAM 104 and console panel 106. Furthermore, each block shown in FIG. 2 is initialized to allow the image processing apparatus 1 image reading device 10, image forming device 11 and storage device 12 to operate.

After the S1000 initialization completes, S1010 is performed to effect copy control. This step is a step for implementing a copy operation started by pressing on print key 1002 shown in FIG. 4, and control for outputting data to be printed that is received through network 6. This step will not herein be described as it is generally performed in image processing apparatuses.

Then S1020 is performed to effect a box process. This process is performed by an image processing apparatus when control of registering a box, a sequence performed in the registration, and printing in response to an instruction from mobile equipment are performed. The S1020 box process will be described with reference to a subroutine more specifically hereinafter.

After S1020 completes, the control proceeds with S1030 to effect other operations and returns to S1010. Note that the other operations at S1030 correspond to controlling image reading device 10, controlling storage device 12, handling network interface 13, and the like, which are operations generally performed in image processing apparatuses.

The S1020 box process will now be described with reference to FIGS. 23-26 flow charts. S1100-S1260, or the FIG. 23 flow chart, are process steps performed in an image processing apparatus registering a new box therewith. The FIG. 20 flow chart, or S1300-S1340, are process steps effected in an image processing apparatus performing an operation to erase a box. The FIGS. 24-25 S1350-S1600 are process steps performed in an image processing apparatus receiving information transmitted by an image processing apparatus registering a new box therewith. Note that in FIG. 26, S1700 and S1710 are steps performed in an image processing apparatus instructed via mobile equipment 4 to print out data.

[Process Effected at Image Processing Apparatus 1 that Instructs Registration of New Box]

Figure 23:
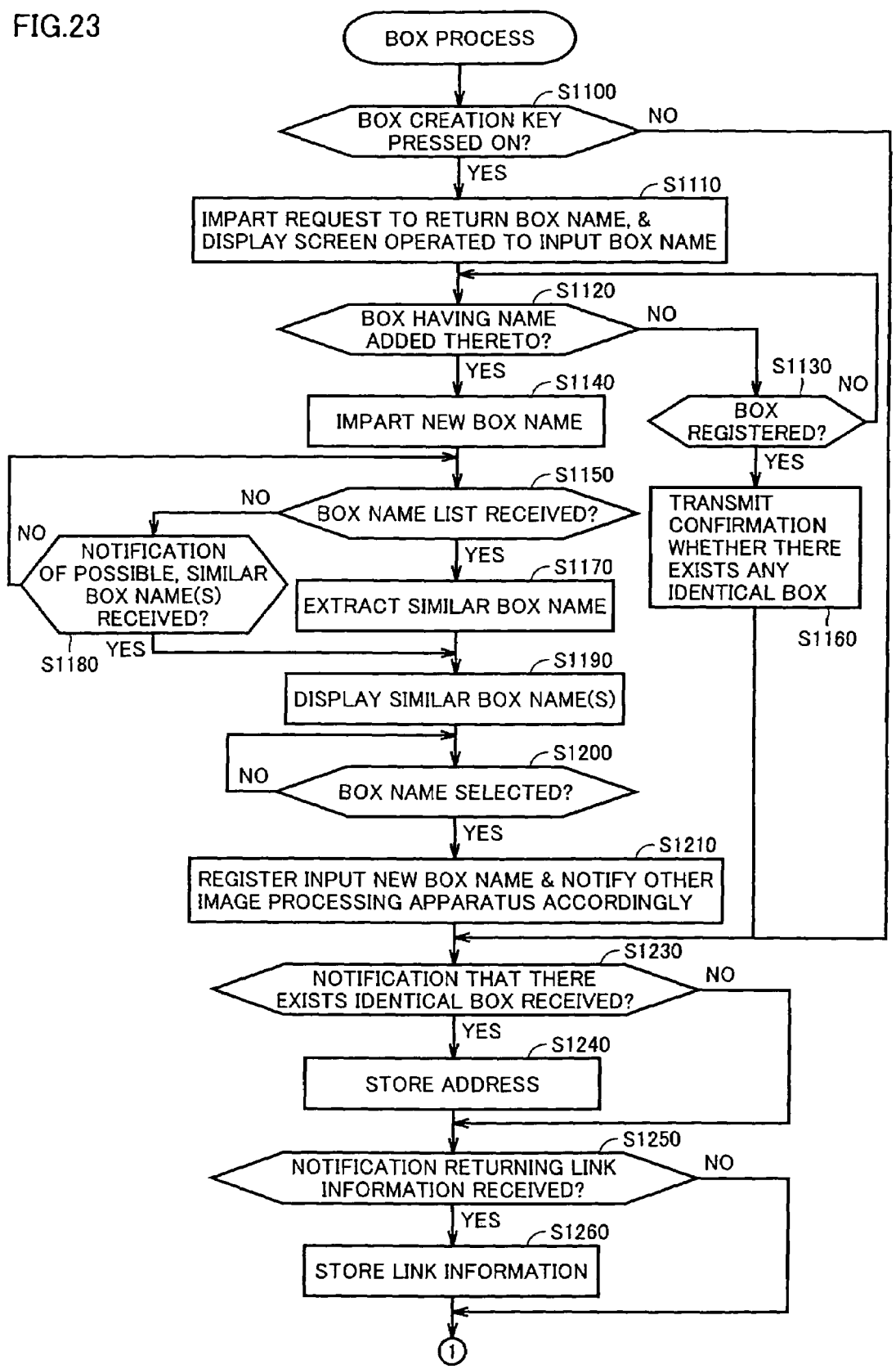
FIGS. 23-26 are a flow chart representing a box process of step 1020.

With reference to FIG. 23, initially at S1100 image processing apparatus 1 detects whether box creation key 1006 has been pressed on. Herein, it detects when box creation key 1006 is pressed on. Hereinafter when a key is pressed on will be referred to as an "ON edge." For box creation key 1006 continuously held down, an ON edge is once detected, and a subsequent ON edge will not be detected until box creation key 1006 is released and again pressed on.

Then at S1100 if apparatus 1 detects an ON edge of box creation key 1006 (YES at S1100) it proceeds with S1110 to transmit to a different image processing apparatus the notification to request it to return a box name (indicated in FIG. 5 by T1).

Furthermore at S1100 if apparatus 1 detects an ON edge of box creation key 1006 then at S1110 the notification to request an apparatus to return a box name is transmitted and touch panel display portion 1004 also displays the FIG. 14 registration operation screen. Herein, the registration operation screen's data previously stored at a memory location for example of Flash ROM 102 is read and placed at a memory location for causing touch panel display portion 1004 to display the data to display the registration operation screen on touch panel display portion 1004. The control then proceeds with S1120.

At S1100 if apparatus 1 does not detects an ON edge of box creation key 1006 (NO at S1100) it proceeds with S1230 and effects a sequential process, which will be described later, introduced after a box name has been registered.

Then at S1120 a box name is input and whether a name has been attached to a box is determined. This decision is made by detecting an ON edge of the name decision key on the FIG. 14 screen. If the name decision key's ON edge is detected (YES at S1120) the control proceeds with S1140.

If the name decision key's ON edge is not detected (NO at S120) then the control proceeds with S1130 to determine whether a box has been registered. This decision is made by detecting an ON edge of the name registration key on the FIG. 14 screen. If the name registration key's ON edge is detected (YES at S1130) the control proceeds with S1160.

At S1160, a confirmation of whether there exists an identical box (indicated in FIG. 7 by T21) is transmitted to the different image processing apparatus and the control proceeds with S1230.

If at S1130 an ON edge is not detected (NO at S1130) then the control returns to S1120. More specifically, S1120 or S1130 is performed to detect an ON edge of the name decision key or the name registration key on the FIG. 14 screen and wait until an ON edge of either one of the keys is detected.

At S1140, notification of a new box name (indicated in FIG. 6 by T11) is transmitted to the different image processing apparatus to notify the apparatus of a request to obtain any identical or similar box names possessed by the different apparatus.

Then the control proceeds with S1150, at which step the control determines whether notification returning a box name list Indicated in FIG. 5 by T2) is received from the different image processing apparatus as notification returned in response to the notification issued at S1110 to request the apparatus to return a box name.

At S1150 if notification returning a box name list has been received from the different image processing apparatus (YES at S1150) the control proceeds with S1170, at which step the box name list received from the different image processing apparatus is compared with the box name input at S1120 and if there exist any identical or similar box names in the list the names are extracted. Then at S1190 the extracted box names are displayed on the FIG. 16 registration operation screen.

In this step, a code attached for each box included in the box name list can be used to help to perform a process in CPU 101 to rapidly perform an identity decision process. Furthermore, by S1170, a box name that a different image processing apparatus has can be confirmed before a new box name is registered with image processing apparatus 1 of interest. This can prevent erroneous registration with image processing apparatus 1 of a box name identical to a box possessed by the different image processing apparatus. Furthermore it can also prevent erroneous registration of a different box name when a new box of a name identical to a box name possessed by a different image processing apparatus is registered with image processing apparatus 1 of interest.

If at S1150 there is no box name list received from the different image processing apparatus (NO at S1150) the control proceeds with S1180, at which step the control determines whether notification of a possible, similar box name indicated in FIG. 6 by T12) is received from the different image processing apparatus as notification returned in response to the notification issued at S1140.

If so (YES at S1180) then the control proceeds with S1190, at which step a box name received from the different image processing apparatus is displayed.

If at step S1180 there is not any notification of a possible, similar box name received from the different image processing apparatus (NO at S1180) the control returns to S1150 and repeats the step of detecting whether notification that returns a box name list has been received from the different image processing apparatus and the step S1180 of detecting whether notification of a possible, similar box name has been received.

At S1200, the control waits until an operation is performed to select a box name from a candidate box name(s) displayed on the FIG. 16 screen or an operation is performed to press on the name registration key, and if either one of the operations is performed (YES at S1200) the control proceeds with S1210.

At S1210, an input box name is registered and notification of the registered box name (indicated in FIGS. 5 and 6 by T3 and T13, respectively) is transmitted to the different image processing apparatus and the control then proceeds with S1230. At S1200, a box name can be selected from a candidate box name(s) displayed on the FIG. 16 screen. Thus a box name can efficiently be registered.

Then at S1230 the control determines whether notification returned from the different image processing apparatus that there is an identical box (indicated in FIG. 7 by T22) has been received in response to the confirmation transmitted at S1160 as to whether there is any identical box. If so (YES at S1230) the control proceeds with S1240, at which step, received information of an address of the image processing apparatus on a network is correlated with a registered box and thus stored and the control proceeds with S1250.

If at S1230 no reception of notification from the different image processing apparatus that there is an identical box is detected (NO at S1230) then the control skips S1240 and proceeds with S1250.

At S1250 the control determines whether notification returning link information (indicated in FIGS. 5, 6 and 7 by T4, T14 and T23, respectively) has been received from the different image processing apparatus. If so (YES at S1250) the control proceeds with S1260, at which step the link information received from the different apparatus is stored to a box of image processing apparatus 1 that has attached thereto a box name included in the link information. The control then proceeds with the FIG. 24 S1300.

Figure 24:
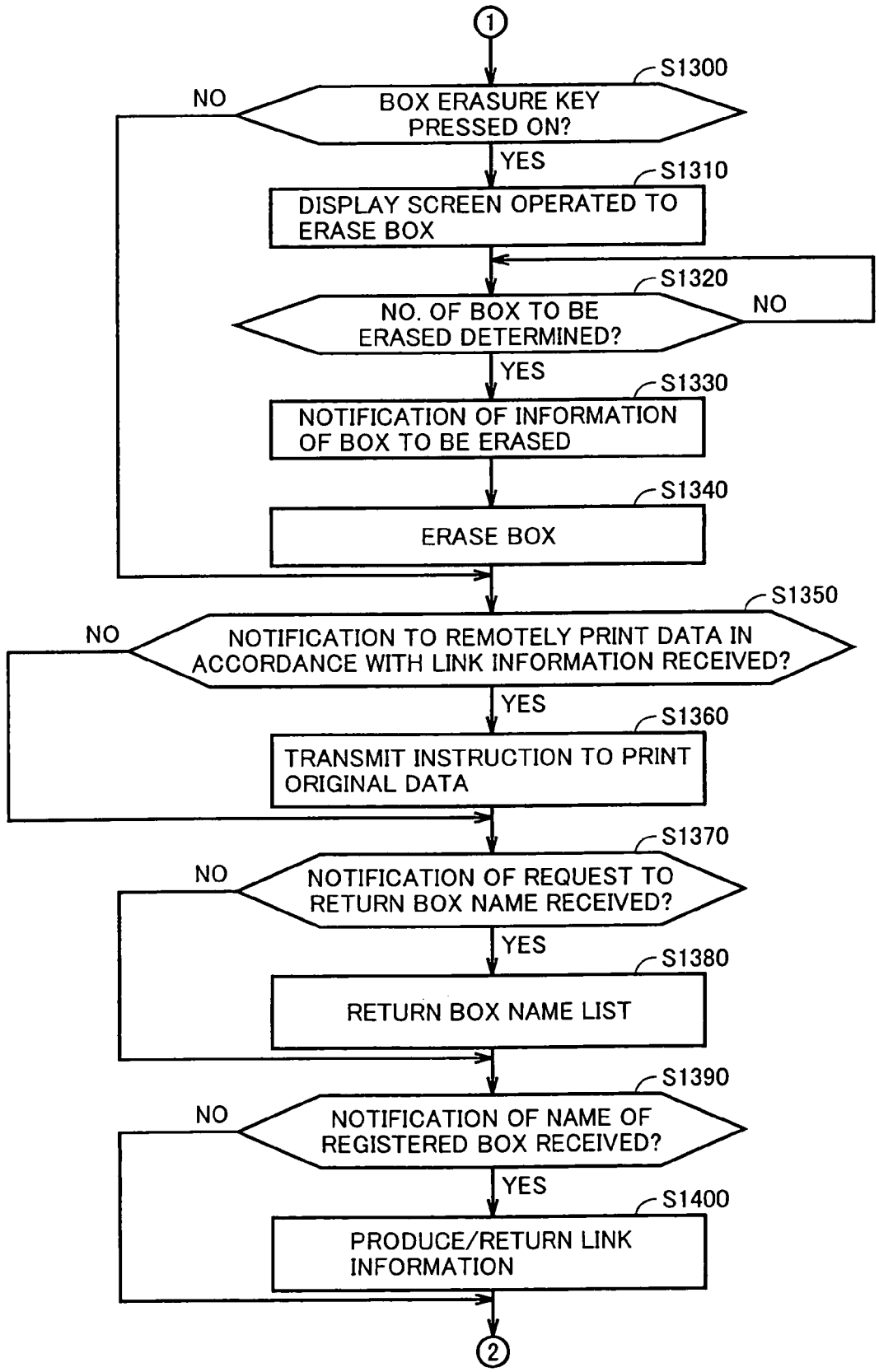

If at S1250 no reception of notification from the different image processing apparatus returning link information is detected (NO at S1250) then the control skips S1260 and proceeds with the FIG. 24 S1300.

[Process Effected at Image Processing Apparatus 1 that Instructs Erasure of Box]

Then, with reference to FIG. 24, at S1300 image processing apparatus 1 determines whether box erasure key 1002 has been pressed on. If at S1300 an ON edge of box erasure key 1002 is detected (YES at S1300) the control proceeds with S1310, at which step, touch panel display portion 1004 displays the FIG. 17 erasure operation screen. Again, the erasure operation screen's data previously stored at a memory location for example of Flash ROM 102 is read and placed at a memory location for causing touch panel display portion 1004 to display the data to display the erasure operation screen on touch panel display portion 1004.

On the FIG. 17 erasure operation screen, numeral key 1001 is used to select a box to be erased and an erasure decision key is pressed to erase the box of interest from image processing apparatus 1.

On the FIG. 17 screen, numeral key 1001 is pressed to input a number, which is displayed for example on copy count display portion 1000 shown in FIG. 4, and when the FIG. 17 screen's erasure decision key is pressed on, content displayed on copy count display portion 1000 changes to a set sheet count for duplication.

After at step S1310 touch panel display portion 1004 displays the erasure operation screen, the control proceeds with S1320, at which step the control determines whether there is detected an ON edge of the erasure decision key of the FIG. 17 screen. At S1320, the control waits until the erasure decision key's ON edge is detected, and if the ON edge is detected (YES at S1320) the control proceeds with S1330.

At step S1330, notification of information of a box to be erased (indicated in FIG. 8 by T31) is transmitted to the different image processing apparatus, and at S1340 a box determined to be erased is erased from storage device 12. The control then proceeds with S1350.

If at S1300 the box erasure key 1002 ON edge is not detected (NO at S1300) then the control skips S1310-S1340 and proceeds with S1350.

At S1350 the control determines whether notification issued to remotely print out data in accordance with link information (indicated in FIG. 9 by T41) has been received from mobile equipment 4. If so (YES at S1350) then the control proceeds with S1360, at which step an instruction to print out original data Indicated in FIG. 9 by T42) is transmitted to an image processing apparatus included in the notification received at S1350. Note that the instruction transmitted at S1360 includes original data as well as an instruction for executing printing out. The control then proceeds with S1370.

If at S1350 there is no notification received from mobile equipment 4 to remotely print out data in accordance with link information (NO at S 1350) the control skips S1360 and proceeds with S1370.

Note that S1370 and the subsequent steps are effected at image processing apparatus 1 receiving notification from an image processing apparatus performing the above described box registration and erasure operations.

In other words, S1370 and S1380 indicate process steps performed by image processing apparatus 1 receiving notification of a request to return a box name to obtain a box name possessed by image processing apparatus 1 included in the present system when a new box is to be registered.

At S1370 image processing apparatus 1 determines whether notification of a request to return a box name has been received from the different image processing apparatus and if so (YES at S1370) then S1380 is performed to list a name(s) of a box(es) possessed by image processing apparatus 1 and by notification returning a box name list (indicated in FIG. 5 by T2) return the list to the different image processing apparatus. The control then proceeds with S1390.

If at S1370 notification of a request to return a box name is not received from the different image processing apparatus (NO at S1370) then the control skips S1380 and proceeds with S1390.

S1390 and S1400 indicate process steps performed at image processing apparatus 1 receiving notification of a registered box name transmitted from an image processing apparatus having registered a new box therewith.

At S1390 image processing apparatus 1 determines whether notification of a registered box name has been received from the different image processing apparatus. If so (YES at S1390) the control proceeds with S1400, at which step if there exists in image processing apparatus 1 a box having a name identical to an imparted, registered box name then link information stored in that box is produced and returned (indicated in FIGS. 5 and 6 by T4 and T14, respectively) to the different image processing apparatus. The control then proceeds with the FIG. 25 S1500.

Figure 25:
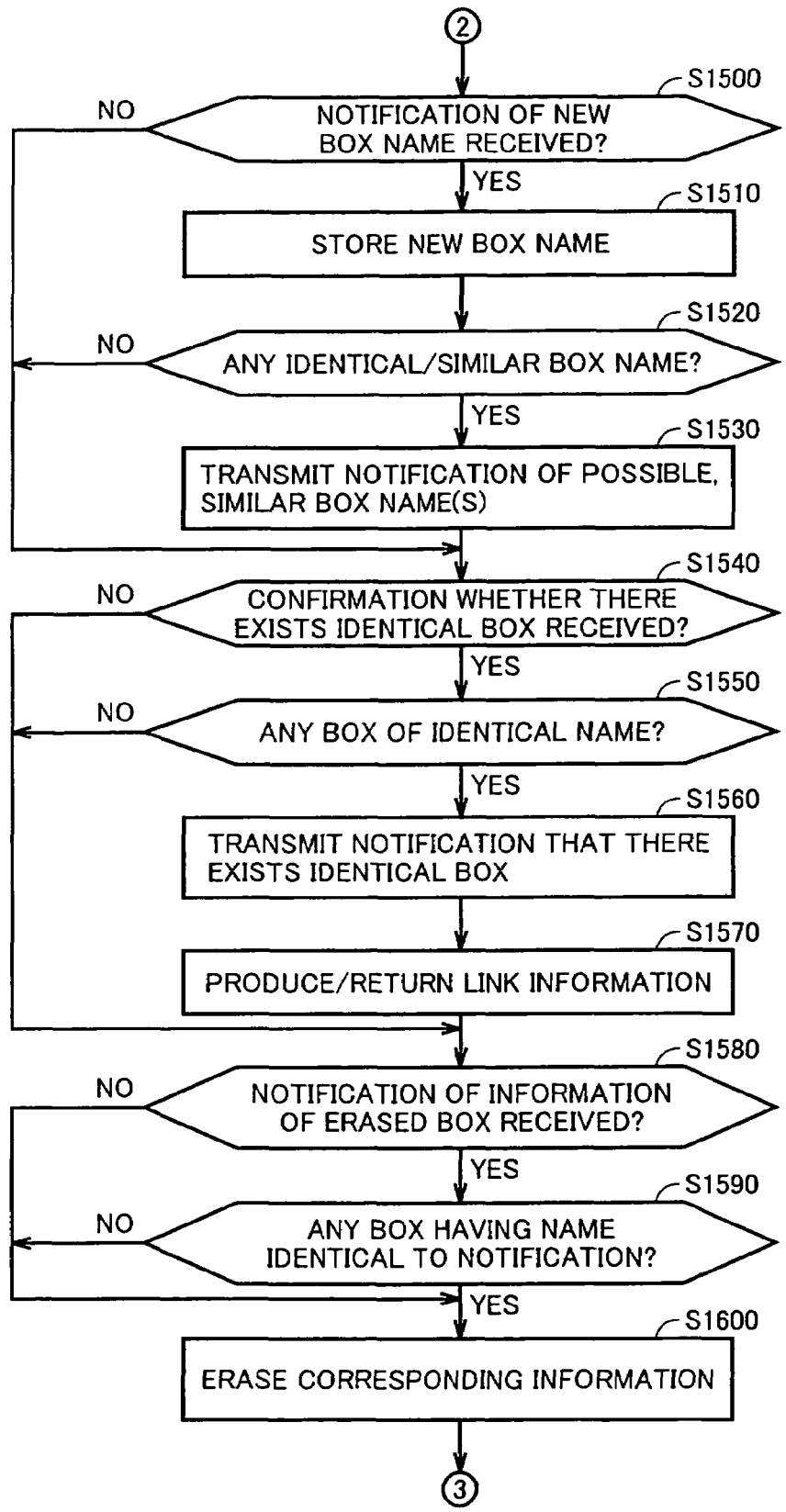

If at S1390 notification of a registered box name is not received from the different image processing apparatus (NO at S1390) then the control skips S1400 and proceeds with the FIG. 25 S1500.

[Process Effected at Image Processing Apparatus 1 Other than Image Processing Apparatus Performing the Above Process]

In the FIG. 25 flow chart, S1500-S1530 indicate process steps performed at image processing apparatus 1 receiving notification of a new box name from an image processing apparatus registered a new box. This corresponds in FIG. 6 to a process performed at image processing apparatuses 1b and 1c receiving notification of a new box name T11 from image processing apparatus 1a.

With reference to FIG. 25, initially at S1500 the control determines whether notification of a new box name has been received from a different image processing apparatus having received a box name to register a new box name. If so (YES at S1500) a new box's name received from the different image processing apparatus is stored at S1510 to storage device 12. Furthermore at S1520 the control determines whether there already exists in the image processing apparatus 1 storage device 12 a box having a name identical or similar to the received new box's name.

If not (NO at S1520) then the control skips S1530, that is, the control does not provide a return notification process as image processing apparatus 1c does, as shown in FIG. 6, and the control proceeds with S1540.

If at S1520 image processing apparatus 1 has stored in storage device 12 a box having a name identical or similar to the received new box name (YES at S1520) then at S1530 the identical or similar box name existing in the image processing apparatus 1 storage device 12 is returned to the different image processing apparatus by notification of a possible, similar box name. In other words, as has been described with reference to FIG. 6 for image processing apparatus 1b, an identical box name or a similar box name is returned by notification of a possible, similar box name T12 to image processing apparatus 1a.

Thus the present image processing apparatus at S1520 and S1530 can notify an image processing apparatus registering a new box of a result of deciding whether there exists a box having a name identical or similar to a new box's name. A smaller amount of information can be imparted than when all box names existing in the apparatus of interest are imparted. This can eliminate communication load concentration and prevent a network from having abnormality, failure and the like.

In the FIG. 25 flow chart, S1540-S1570 indicate process steps performed at image processing apparatus 1 receiving a conformation of the presence/absence of an identical box from an image processing apparatus registering a new box therewith without obtaining a new box possessed by a different image processing apparatus. This corresponds in FIG. 7 to a process performed at image processing apparatus 1b, 1c receiving a conformation of whether there is an identical box T21 from image processing apparatus 1a.

At S1540 image processing apparatus 1 determines whether a conformation of whether there exists an identical box has been received from a different image processing apparatus having a new box name registered therewith. If so (YES at S1540) then at S1550 a decision is made as to whether image processing apparatus 1 of interest has a box identical to a box name included in the received conformation. If so (YES at S1550) then the control proceeds with S1560, at which step, notification that there exists an identical box (indicated in FIG. 7 by T22) is transmitted to the different image processing apparatus. Furthermore S1570 is performed to produce link information of original data stored in the identical box and return (indicated in FIG. 7 by T23) the link information to the different image processing apparatus. The control then proceeds with S1580. Note that these process steps, as seen in FIG. 7, are performed by image processing apparatus 1c.

If at S1540 there is not received from the different image processing apparatus a conformation of whether there exists an identical box (NO at S1540) or at S1550 there is not possessed a box identical to a box name included in such conformation received from the different image processing apparatus (NO at S1550) then the control skips S1560 and S1570 and proceeds with S1580. Note that these process steps, as seen in FIG. 7, are performed by image processing apparatus 1b.

Then in the FIG. 25 flow chart S1580-S1600 indicate process steps performed at image processing apparatus 1 receiving notification of information of an erased box from an image processing apparatus erasing a box. This corresponds in FIG. 8 to a process performed at image processing apparatus 1b receiving from image processing apparatus 1a the notification of information of an erased box T31.

At S1580 image processing apparatus 1 determines whether notification of information of an erased box has been received from a different image processing apparatus having a box erased therefrom. If so (YES at S1580) then at S1590 a decision is made as to whether there exists in image processing apparatus 1 a box having a box name identical to the erased box name included in the received notification of information of an erased box. If so (YES S1590) then the control proceeds with S1600, at which step, link information stored in the identical box existing in image processing apparatus 1 of interest that has an address of the different image processing apparatus, is removed. The link information to be erased is determined by an address of an apparatus having original data and a box name that are included in link information.

Figure 26:
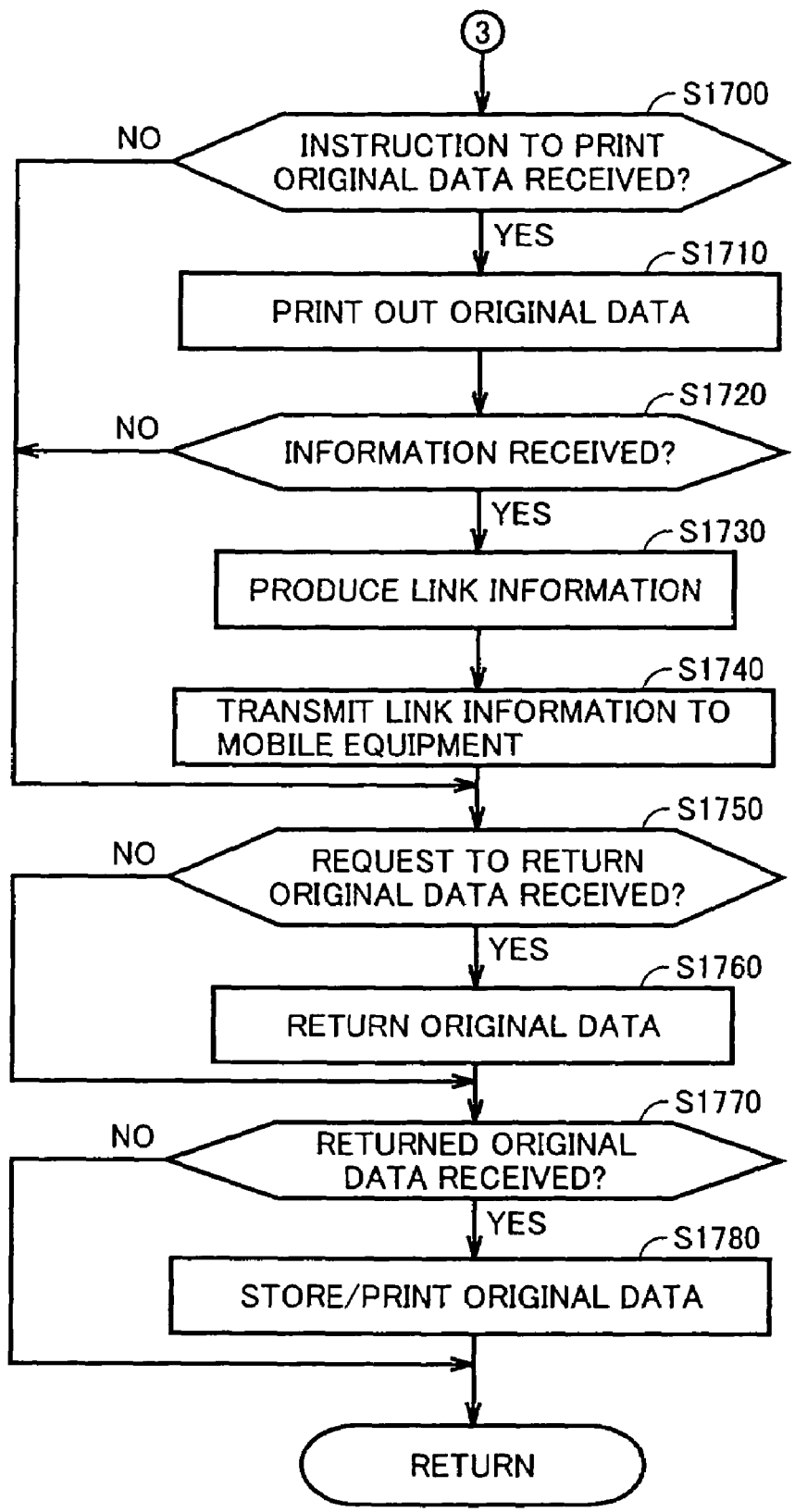

If at S1580 no notification of information of an erased box is received from the different erase processing apparatus (NO at S1580) then the control proceeds with the FIG. 26 S1700. Furthermore, if at S1590 there does not exist in image processing apparatus 1 of interest a box having a name identical to an erased box name included in the received notification of information of an erased box (NO at S1590) the control also proceeds with the FIG. 26 S1700.

In the FIG. 26 flow chart, S1700 and S1710 indicate process steps performed by image processing apparatus 1 receiving an instruction from mobile equipment 4 to print out data. This corresponds in FIG. 9 to a process performed at image processing apparatus 1b receiving an instruction T42 from mobile equipment 4 to print out original data.

At S1700, image processing apparatus 1 determines whether an instruction has been received from mobile equipment 4 to print out original data. If so (YES at S1700) then at S1710 it prints out original data received from mobile equipment 4. The control then proceeds with S1720.

If at S1700 there is not received an instruction from mobile equipment 4 to print out original data (NO at S1700) then the control skips S1710 and proceeds with S1720.

At S1720 image processing apparatus 1 determines whether information has been received from a different image processing apparatus through network 6. Information received at S1720 corresponds to original data of an individual or department transmitted from a different image processing apparatus. Then at S1730 image processing apparatus 1 stores original data received from a different image processing apparatus to a box in storage device 12 and produces link information. Subsequently at S1740 the link information produced at S1730 is transmitted to mobile equipment 4.

If at S1720 there is not received information from a different image processing apparatus (NO at S1720) then the control proceeds with S1750, at which step a decision is made as to whether a request to return original data (indicated in FIG. 7 by T24) has been received from a different image processing apparatus. If so (YES at S1750) then at S1760 the request is accommodated by returning (indicated in FIG. 7 by T25) original data to the different image processing apparatus. At S1760 image processing apparatus 1 returns only original data requested by the different image processing apparatus and required original data alone is accordingly returned at S1760.

Then at S1770 image processing apparatus 1 determines as to whether original data returned has been received from a different image processing apparatus. If so (YES at S1770) then at S1780 image processing apparatus 1 stores the received original data to a box stored in storage device 12 or prints out the data.

Image processing apparatus 1 thus provides the box process indicated in FIG. 22 by S1020.

[Process in Mobile Equipment 4]

Hereinafter a process effected in mobile equipment 4 will be described with reference to the FIG. 27 flow chart. The FIG. 27 flow chart represents a process implemented by the mobile equipment 4 control portion (not shown) configured of a CPU reading and executing a program stored in a storage portion. The FIG. 27 process is started for example by powering on (not shown) mobile equipment 4 to supply the equipment with power.

Figure 27:
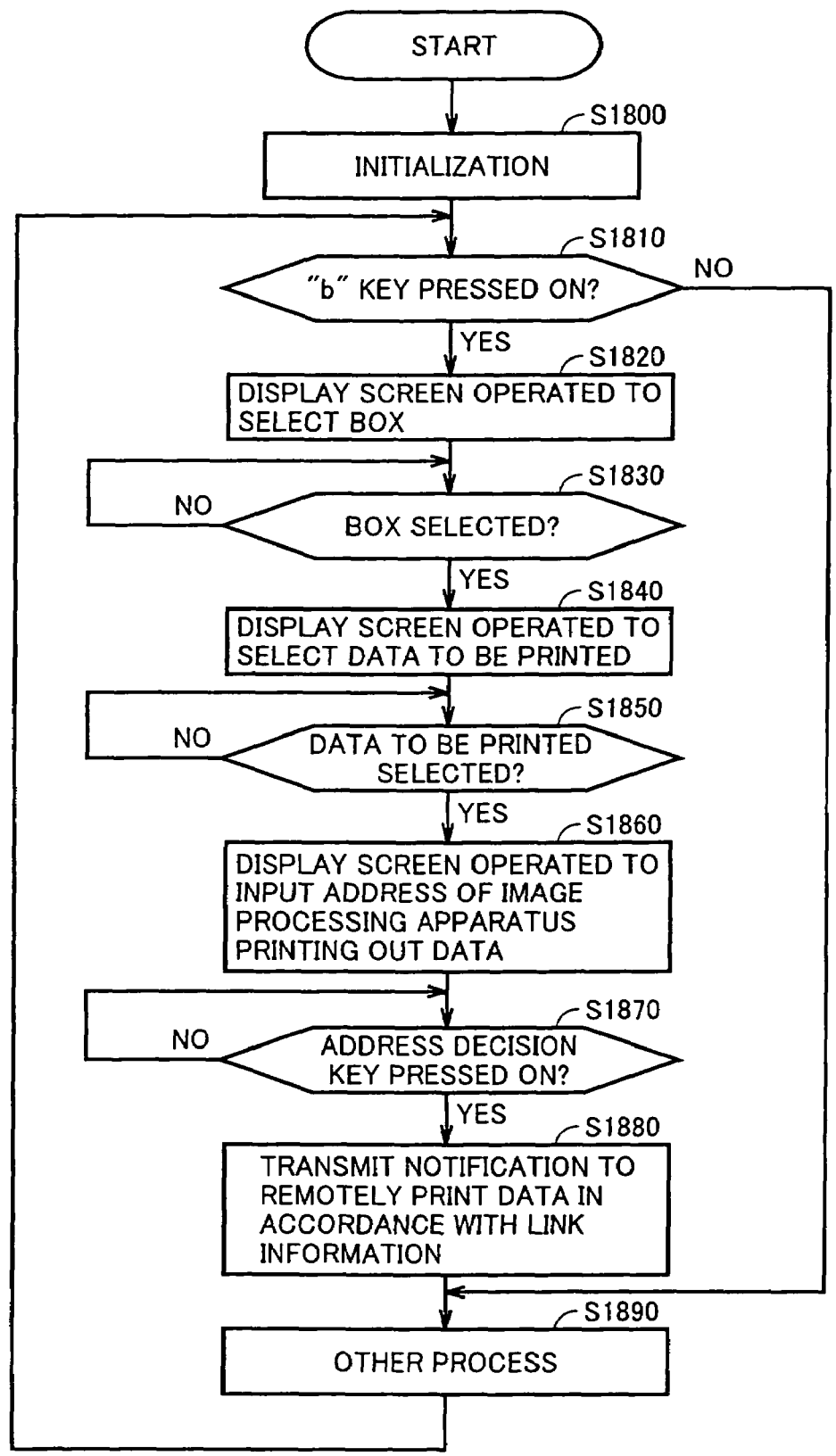
FIG. 27 is a flow chart representing a process performed in mobile equipment 4.

With reference to FIG. 27, when the process starts, initially at S1800 the mobile equipment 4 CPU and communication portion (not shown) and the FIG. 18 touch panel display portion are initialized and the control proceeds with S1810.

At S1810 a decision is made as to whether an input has been entered to start an operation selecting data to be printed out. This decision is made by detecting an ON edge of the b key 1011 shown in FIG. 18. If the b key 1011 ON edge is detected (YES at S1810) then at S1820 the FIG. 19 printout operation screen is displayed on touch panel display portion 1010 and at S1830 the FIG. 19 keys 1021 and 1022 are used to accept selection of a name of a box having stored therein link information of data to be printed. Then the control waits until an ON edge of the FIG. 4 S key is detected, waiting for a box name to be determined.

Then if at S1830 a name of a box having stored therein link information of data to be printed is determined (YES at S1830) then the control proceeds with S1840, at which step the FIG. 20 screen operated to select data to be printed is displayed on touch panel display portion 1010.

Then at S1850 the FIG. 20 keys 1024 and 1025 are used to accept selection of a name of a file indicating data to be printed. Then the control waits until the FIG. 4 S key's ON edge is detected, waiting for a file name to be determined.

At S1850 if a name of a file indicating data to be printed is determined (YES at S1850) then the control proceeds with S1860, at which step the FIG. 21 screen operated to set an address of an apparatus printing out data is displayed on touch panel display portion 1010. However, mobile equipment 4 has an address of an image processing apparatus having a name of a file of original data and a box name alone. Accordingly, link information of original data will have in effect been selected.

Then the control proceeds with S1870 and the Roman alphabetical and numeral keys are pressed to input an address of an image processing apparatus that prints out data. Then the control waits until the FIG. 21 address decision key's ON edge is detected, waiting for an address to be determined.

Then at S1870 the address of the image processing apparatus printing out data that has been input is determined (YES at S1870) the control proceeds with S 1880, at which step, notification issued to remotely print out data in accordance with link information (indicated in FIG. 9 by T41) is transmitted to an image processing apparatus included in the link information selected at S1850. The notification transmitted at S1880 includes the selected link information and an address of an apparatus printing out data that is set at S1860. The selected link information and the address of an apparatus printing out data are information required to allow an image processing apparatus receiving the information and the address to transmit original data to an image processing apparatus printing out data.

After the transmission at S1880 the control proceeds with S1890, at which step a process unique to mobile equipment 4 is performed. Thereafter the control returns to S1810. S1890 is a step effected in a typical mobile phone or similar mobile equipment 4.

The present image processing apparatus that performs the above described process allows a name or other similar additional information-added box to be used to control information. Furthermore, the above described process can help for example to produce and change additional information, as intended.

Furthermore if the present image processing apparatus is used in a system configured of a plurality of networked image processing apparatuses and one of the apparatuses registers a new box therewith, a decision is made as to whether there exists in the other apparatuses a box having an identical or similar name. In doing so, the present image processing apparatus that performs the above described process imparts a result of a decision of identity or similarity, rather than imparting via the network all box names possessed by the other image processing apparatuses. This can eliminate communication load concentration for example in producing and changing additional information.

Furthermore, the above described image processing apparatus performs an information management method, which can be provided in the form of a program. Such a program can be recorded on computer readable recording media such as a flexible disk, compact disk-ROM (CD-ROM), ROM, RAM and a memory card attached to a computer, and thus provided as a program product. Alternatively, it may be recorded on a recording medium such as a hard disk incorporated in a computer for provision. The program can also be downloaded via a network for provision.

The program product provided is installed in a program storage unit such as a hard disk and executed. Note that the program product includes the program itself and a recording medium having the program recorded therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   a sortation memory portion provided in a form of a virtually sorted, prescribed memory area to store information sorted by each prescribed condition for said prescribed condition;
   an information adding portion adding additional information to said sortation memory portion;
   an acquisition portion acquiring from a different image processing apparatus information including additional information;
   a comparison and display portion comparing the additional information acquired by said acquisition portion from said different image processing apparatus with the additional information added by said information adding portion to said sortation memory portion, and displaying similar additional information; and
   a registration portion selectively registering one of the additional information displayed by said comparison and display portion and the additional information added by said information adding portion to said sortation memory portion, to allow the image processing apparatus and the different image processing apparatus to share said sortation memory.

2. The apparatus of claim 1, wherein when the additional information registered by said registration portion is identical to a prescribed item included in the additional information acquired by said acquisition portion from said different image processing apparatus, said information adding portion adds to said sortation memory portion information of a destination of a link, said information of the destination of the link being information of an access to a sortation memory portion included in said different image processing apparatus.

3. The apparatus of claim 2, wherein said information adding portion further includes an input portion inputting a name serving as said additional information, and said prescribed item is a name.

4. An image processing apparatus comprising:
   a sortation memory portion provided in a form of a virtually sorted, prescribed memory area to store sorted information;
   an information adding portion adding additional information to said sortation memory portion;
   an acquisition portion acquiring from a different image processing apparatus information including additional information;
   a comparison portion comparing the additional information acquired by said acquisition portion from said different image processing apparatus with the additional information added by said information adding portion to said sortation memory portion to acquire a result of said comparing; and
   a registration portion driven by said result to register the additional information added by said information adding portion to said sortation memory portion, to allow the image processing apparatus and the different image processing apparatus to share said sortation memory.

5. The apparatus of claim 4, wherein said information adding portion adds to said sortation memory portion additional information acquired from a different apparatus.

6. The apparatus of claim 4, wherein said information adding portion further includes an input portion inputting a name serving as said additional information and adds to said sortation memory portion a name input via said input portion.

7. The apparatus of claim 4, wherein said acquisition portion acquires from said different image processing apparatus information including additional information added to a sortation memory portion of said different image processing apparatus and information of a date and time of registration of said additional information with said different image processing apparatus.

8. The apparatus of claim 4, wherein said information adding portion further includes a supplementation portion supplementing the additional information added to said sortation memory portion and said registration portion registers additional information supplemented by said supplementation portion.

9. The apparatus of claim 4, further comprising a display portion displaying information including additional portion acquired by said acquisition portion from said different image processing apparatus.

10. The apparatus of claim 4, further comprising a result display portion displaying said result of said comparison provided by said comparison portion, wherein said registration portion further includes a select portion selecting additional information to be registered from said result displayed by said result display portion.

11. An image processing apparatus comprising:
   a sortation memory portion provided in a form of virtually sorted, prescribed memory area to store information of an original sorted by identification information;

a registration portion registering information with said sortation memory portion;

a notification portion notifying a different image processing apparatus of information registered by said registration portion;

an acquisition portion acquiring from said different image processing apparatus information of an original stored in said different image processing apparatus at a sortation memory portion having registered therewith information identical to information imparted by said notification portion; and a storage portion storing to said sortation memory portion information of an original acquired by said acquisition portion from said different image processing portion, to allow the image processing apparatus and the different image processing apparatus to share said sortation memory.

12. The apparatus of claim 11, wherein said acquisition portion acquires from said different image processing apparatus information including at least one of information stored by said registration portion to said different image processing apparatus's sortation memory portion, information of an access to said different image processing apparatus, and a name identifying said sorted information.

13. An image processing apparatus comprising:

a sortation memory portion provided in a form of a virtually sorted, prescribed memory area to store sorted information;

an information adding portion adding additional information to said sortation memory portion;

an acquisition portion acquiring from a different image processing apparatus information including additional information;

a decision portion deciding whether there exists in the image processing apparatus of interest additional information added by said information adding portion to said sortation memory portion that is identical to additional information acquired by said acquisition portion from said different image processing apparatus; and an erasure portion driven by a result of a decision made by said decision portion and the additional information acquired by said acquisition portion from said different image processing apparatus to erase said information stored in said sortation memory portion that is associated with the additional information acquired by said acquisition portion from said different image processing apparatus, to allow the image processing apparatus and the different image processing apparatus sharing said sortation memory to erase appropriate information.

14. An image processing apparatus comprising:

a sortation memory portion provided in a form of a virtually sorted, prescribed memory area to store information of an original sorted by additional information added to an image of the original;

a detection portion detecting that said additional information has at least a portion designated;

an erasure portion erasing from said sortation memory portion additional information detected by said detection portion as having been designated and said information of the original with said additional information added thereto; and a notification portion notifying a different image processing apparatus of said additional information erased by said erasure portion, to allow the image processing apparatus and the different image processing apparatus sharing said sortation memory to erase appropriate information.

15. An additional-information notification system comprising a plurality of image processing apparatuses each including:

a sortation memory portion provided in a form of a virtually sorted, prescribed memory area to store sorted information;

an information adding portion adding additional information to said sortation memory portion;

a first notification portion notifying a different image processing apparatus of said additional information added by said information adding portion to said sortation memory portion;

a decision portion deciding whether there exists in said image processing apparatus additional information identical or similar to additional information imparted by said first notification portion from a different image processing apparatus;

a second notification portion notifying of a result of a decision made by said decision portion said different image processing apparatus notified by said first notification portion of said additional information; and a registration portion driven by said result informed by said second notification portion from a different image processing apparatus to register with said image processing apparatus of interest said additional information added by said information adding portion to said sortation memory portion, to allow the image processing apparatus and the different image processing apparatus to share said sortation memory.

16. An additional-information notification system comprising a plurality of information processing apparatuses including first and second image processing apparatuses, said first and second image processing apparatuses including:

a sortation memory portion provided in a form of a virtually sorted, prescribed memory area to store sorted information;

an information adding portion adding additional information to said sortation memory portion;

an identification information production portion producing identification information identifying information stored in said sortation memory portion having said additional information added thereto;

a transmission portion transmitting to said first image processing apparatus said identification information produced by said identification information production portion;

a reception portion receiving identification information transmitted by said transmission portion from said second image processing apparatus;

a first storage portion driven by said additional information added by said information adding portion to said sortation memory portion to store to said sortation memory portion said identification information received by said reception portion from said second image processing portion;

a select portion selecting said identification information stored by said first storage portion to said sortation memory portion; a request portion driven by said identification information selected by said select portion to request information stored in said second image processing apparatus at said sortation memory portion;

a return notification portion operative in response to a request from said first image processing apparatus by said request portion to return to said first image processing apparatus said information stored in said sortation memory portion; and a second storage portion storing to said sortation memory portion said information returned by said return notification portion from said second image processing portion, to allow the first image processing apparatus and the second image processing apparatus to share said sortation memory.

17. An image information communication system comprising an image processing apparatus and a communication terminal, said image processing apparatus including:
   a sortation memory portion provided in a form of a virtually sorted, prescribed memory area to store sorted information;
   a notification portion notifying said communication terminal of identification information used to identify information stored in said sortation memory portion;
   an instruction reception portion receiving a printing instruction from said communication terminal; and
   a transmission portion driven by said printing instruction received by said instruction reception portion from said communication terminal to transmit to a different image processing apparatus said information stored in said sortation memory portion, to allow the image processing apparatus to print information stored in the different image processing apparatus.

18. The system of claim 17, wherein said communication terminal includes: a memory portion storing said identification information; and an instruction portion driven by said identification information stored in said storage portion to identify information to be printed, and issue said printing instruction to said image processing apparatus.

19. The system of claim 17, wherein said instruction reception portion and said transmission portion perform communication in different manners of communication.

20. An image processing method comprising the steps of:
   adding additional information to a sortation memory portion of an image processing apparatus, said sortation memory portion provided in a form of a virtually sorted, prescribed memory area to store information sorted by each prescribed condition for said prescribed condition;
   acquiring from a different image processing apparatus information including additional information;
   comparing the additional information acquired from said different image processing apparatus at the step of acquiring with the additional information added to said sortation memory portion at the step of adding, and displaying similar additional information; and
   selectively registering one of the additional information displayed at the step of comparing and displaying and the additional information added to said sortation memory portion at the step of adding, to allow the image processing apparatus and the different image processing apparatus to share said sortation memory.

21. An image processing method comprising the steps of:
   adding additional information to a sortation memory portion of an image processing apparatus, said sortation memory portion provided in a form of a virtually sorted, prescribed memory area to store sorted information;
   acquiring from a different image processing apparatus information including additional information;
   comparing the additional information acquired from said different image processing apparatus at the step of acquiring with the additional information added to said sortation memory portion at the step of adding; and
   registering said additional information added to said sortation memory portion at the step of adding, as based on a result of a comparison made at the step of comparing, to allow the image processing apparatus and the different image processing apparatus to share said sortation memory.

22. An image processing method comprising the steps of:
   registering information with a sortation memory portion of an image processing apparatus, said sortation memory portion provided in a form of a virtually sorted, prescribed memory area storing information of an original sorted by identification information;
   notifying a different image processing apparatus of information registered at the step of registering;
   acquiring from said different image processing apparatus the information of the original sorted stored in said different image processing apparatus's sortation memory portion having registered therewith information identical to that imparted at the step of notifying; and
   storing to said sortation memory portion said information of the original acquired from said different image processing apparatus at the step of acquiring, to allow the image processing apparatus and the different image processing apparatus to share said sortation memory.

23. An image processing method comprising the steps of:
   detecting that additional information added to an image of an original is at least partially designated;
   erasing from a sortation memory portion of an image processing apparatus said additional information detected as having been designated at the step of detecting and information of the original having said additional information added thereto, said sortation memory portion being a virtually sorted, prescribed memory area storing information of an original sorted by additional information added to an image of the original; and
   notifying a different image processing apparatus of said additional information erased at the step of erasing, to allow the image processing apparatus and the different image processing apparatus sharing said sortation memory to erase appropriate information.

* * * * *